United States Patent
Watanabe

Patent Number: 5,410,352
Date of Patent: Apr. 25, 1995

[54] IMAGE DATA COMPRESSING APPARATUS

[75] Inventor: Tohru Watanabe, Musashimurayama, Japan

[73] Assignee: Casio Computer Co., Ltd., Tokyo, Japan

[21] Appl. No.: 23,214

[22] Filed: Feb. 25, 1993

[30] Foreign Application Priority Data

Mar. 2, 1992 [JP] Japan .................................. 4-080454

[51] Int. Cl.$^6$ ............................................. H04N 7/133
[52] U.S. Cl. .................................... 348/405; 348/423; 348/395; 348/396
[58] Field of Search ............... 348/405, 393, 395, 396, 348/403, 423; H04N 7/133

[56] References Cited

U.S. PATENT DOCUMENTS

| | | |
|---|---|---|
| 4,302,775 | 11/1981 | Widergren et al. |
| 4,385,363 | 5/1983 | Widergren et al. |
| 4,725,885 | 2/1988 | Gonzales et al. ..................... 348/411 |
| 4,920,426 | 4/1990 | Hatori et al. ......................... 348/405 |
| 4,984,076 | 1/1991 | Watanabe et al. .................... 348/405 |

OTHER PUBLICATIONS

IEEE 1988 Custom Integrated Circuits Conference, A Video Rate 16×16 Discrete Cosine Transform 1C, A. M. Gottlieb, et al, pp. 8.2.1–8.2.4.

IEEE Transactons on Communications, vol. Com. 25, No. 11, Nov. 1977, Adaptive Coding of Monochrome and Color Images, Wen-Hsiung Chen, et al, pp. 1285–1292.

*Primary Examiner*—Howard W. Britton
*Attorney, Agent, or Firm*—Frishauf, Holtz, Goodman & Woodward

[57] ABSTRACT

An image data compressing apparatus comprises a transform unit, such as a DCT computation unit, a quantization table memory for plural types of quantization tables, a quantizer which selectively uses the quantization tables, a coder for performing coding in accordance with a pre-given predicted value for the amount of generated codes of each block, memories for storing the amounts of codes for DC components and AC components generated for the individual blocks, a computation unit for computing the sum of the amounts of generated codes for DC components and the sum of the amounts of generated codes for AC components for each properly selected quantization table, and memories for storing the computed sums of the amounts of generated codes, wherein the apparatus uses a plurality of quantization tables to predict a change in the amount of generated codes caused by the alteration of the quantization table in the first compression, and compresses image data to the target amount of generated codes in the second compression.

13 Claims, 15 Drawing Sheets

☐ ... QUANTIZATION TABLE 51
▨ ... QUANTIZATION TABLE 53

FIG.5

| | | | | | | | | |
|---|---|---|---|---|---|---|---|---|
| 4 | 21 | 21 | 35 | 52 | 87 | 111 | 133 | |
| 23 | 26 | 30 | 41 | 56 | 126 | 131 | 120 | |
| 30 | 28 | 35 | 52 | 87 | 124 | 150 | 122 | |
| 30 | 37 | 48 | 63 | 111 | 190 | 175 | 135 | 1 FOR Y |
| 39 | 48 | 80 | 126 | 148 | 238 | 225 | 168 | |
| 52 | 76 | 120 | 140 | 177 | 227 | 247 | 201 | |
| 107 | 140 | 170 | 190 | 225 | 255 | 255 | 220 | |
| 157 | 201 | -207 | 214 | 245 | 218 | 225 | 216 | |
| 4 | 34 | 52 | 102 | 216 | 216 | 216 | 216 | |
| 34 | 45 | 56 | 144 | 216 | 216 | 216 | 216 | |
| 52 | 56 | 122 | 216 | 216 | 216 | 216 | 216 | |
| 102 | 144 | 216 | 216 | 216 | 216 | 216 | 216 | 1 FOR C |
| 216 | 216 | 216 | 216 | 216 | 216 | 216 | 216 | |
| 216 | 216 | 216 | 216 | 216 | 216 | 216 | 216 | |
| 216 | 216 | 216 | 216 | 216 | 216 | 216 | 216 | |
| 216 | 216 | 216 | 216 | 216 | 216 | 216 | 216 | |
| 4 | 3 | 3 | 4 | 7 | 12 | 17 | 20 | |
| 3 | 3 | 4 | 5 | 7 | 19 | 20 | 18 | |
| 4 | 4 | 4 | 7 | 13 | 19 | 23 | 19 | |
| 4 | 5 | 6 | 10 | 17 | 29 | 27 | 21 | 2 FOR Y |
| 5 | 6 | 11 | 19 | 23 | 37 | 34 | 26 | |
| 7 | 10 | 18 | 21 | 27 | 35 | 38 | 31 | |
| 14 | 21 | 26 | 29 | 34 | 41 | 40 | 34 | |
| 24 | 31 | 32 | 33 | 37 | 33 | 34 | 33 | |
| 4 | 5 | 7 | 14 | 29 | 29 | 33 | 33 | |
| 5 | 6 | 7 | 19 | 29 | 33 | 33 | 33 | |
| 7 | 7 | 16 | 29 | 33 | 33 | 33 | 33 | |
| 14 | 19 | 29 | 33 | 33 | 33 | 33 | 33 | 2 FOR C |
| 29 | 29 | 29 | 33 | 33 | 33 | 33 | 33 | |
| 29 | 29 | 33 | 33 | 33 | 33 | 33 | 33 | |
| 29 | 33 | 33 | 33 | 33 | 33 | 33 | 33 | |
| 33 | 33 | 33 | 33 | 33 | 33 | 33 | 33 | |

FIG.12
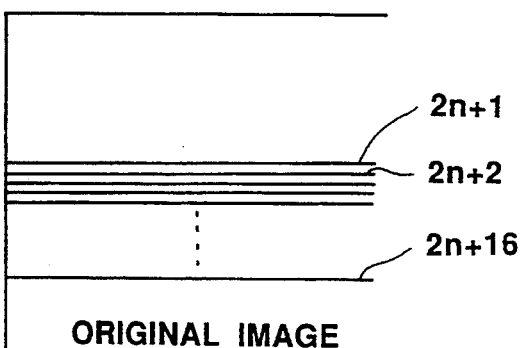
ORIGINAL IMAGE
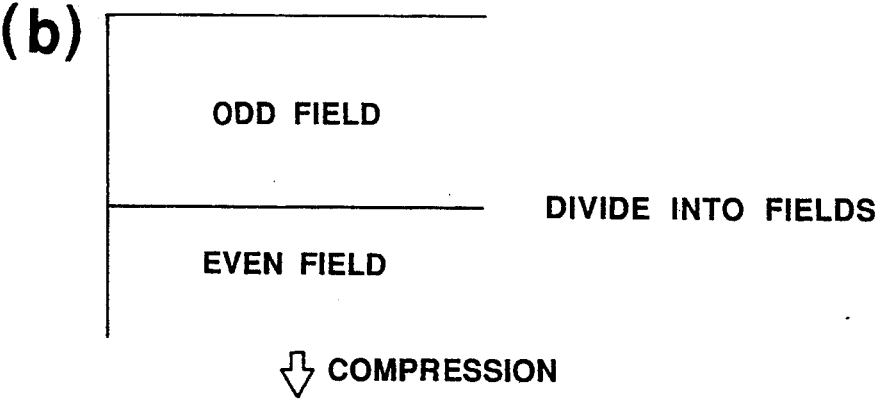
DIVIDE INTO FIELDS
⇩ COMPRESSION
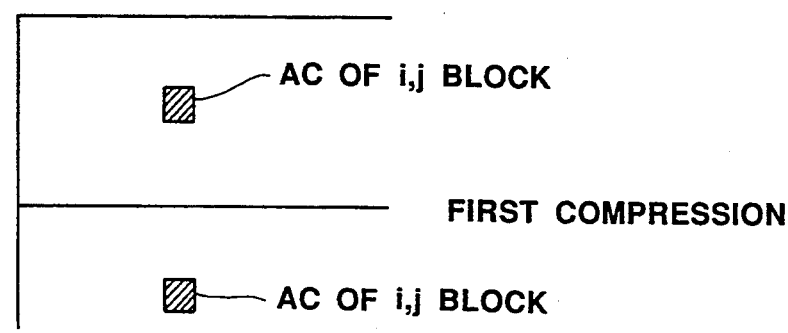
FIRST COMPRESSION
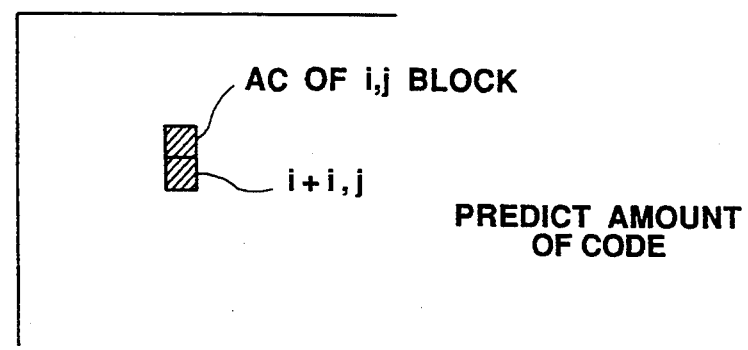
PREDICT AMOUNT OF CODE

FIG.15
(PRIOR ART)

| | | | | | | | | |
|---|---|---|---|---|---|---|---|---|
| 16, | 11, | 10, | 16, | 24, | 40, | 51, | 61 | |
| 12, | 12, | 14, | 19, | 26, | 58, | 60, | 55 | |
| 14, | 13, | 16, | 24, | 40, | 57, | 69, | 56 | |
| 14, | 17, | 22, | 29, | 51, | 87, | 80, | 62 | QUANTIZATION TABLE RAM FOR Y |
| 18, | 22, | 37, | 58, | 68, | 109, | 103, | 77 | |
| 24, | 35, | 55, | 64, | 81, | 104, | 113, | 92 | |
| 49, | 64, | 78, | 87, | 103, | 121, | 120, | 101 | |
| 72, | 92, | 95, | 98, | 112, | 100, | 103, | 99 | |

FIG.16
(PRIOR ART)

| | | | | | | | | |
|---|---|---|---|---|---|---|---|---|
| 17, | 18, | 24, | 47, | 97, | 97, | 98, | 98 | |
| 18, | 21, | 26, | 66, | 97, | 98, | 98, | 99 | |
| 24, | 26, | 56, | 97, | 98, | 98, | 99, | 99 | |
| 47, | 66, | 97, | 98, | 98, | 99, | 99, | 99 | QUANTIZATION TABLE RAM FOR C |
| 66, | 97, | 98, | 98, | 99, | 99, | 99, | 99 | |
| 97, | 98, | 98, | 99, | 99, | 99, | 99, | 99 | |
| 98, | 98, | 99, | 99, | 99, | 99, | 99, | 99 | |
| 98, | 99, | 99, | 99, | 99, | 99, | 99, | 99 | |

IMAGE DATA COMPRESSING APPARATUS

BACKGROUND OF THE INVENTION

1. Field of the Invention

The present invention relates to an image data compressing apparatus and image data compressing method which are used to compress image data, and, more particularly, to an image data compressing apparatus and image data compressing method which have a generated-code-amount control function to control the amount of generated codes.

2. Description of the Related Art

International standards for image compression include JPEG (Joint Photographic Expert Group) and MPEG (Moving Picture Expert Group).

JPEG aims at compressing a still image. Its encoding scheme for color still images has already been determined and will be approved as the international standard. Chips for JPEG have been commercialized and boards having such a chip mounted thereon are appearing on the market.

The JPEG algorithm is generally classified into two compressing systems. The first system is based on DCT (Discrete Cosine Transform), and the second system is a spatial system which performs DPCM (Differential PCM) in two-dimensional space. As the DCT system includes quantization, it is a non-information preserving coding that cannot generally restore the original image completely. But, the DCT system can provide a sufficient decoded image quality with few bits, and is the base of this algorithm. The spatial system, on the other hand, is an information preserving coding that can completely restore the original image though the compression ratio is small, and is added as a standard system to realize this characteristic.

The DCT system is further classified into a baseline system which has the essential function, and an extended system which has an optional function. As an additional system, there is a hierarchical system which is the combination of the above two systems to accomplish progressive buildup.

The baseline system has the minimum function all coders/decoders to accomplish what the DCT system should have, and is an algorithm based on ADCT (Adaptive Discrete Cosine Transform) coding.

In the image compression in the baseline system, image data is processed in blocks each of 8×8 pixels. The processes include:
(1) Two-dimensional DCT transform
(2) Quantization of DCT coefficients
(3) Entropy coding In the two-dimensional DCT transform, spatial data is converted into frequency data and 64 DCT coefficients are produced. In this case, the color components are Y, CB and CR. The left end coefficient in a matrix of the 64 coefficients is called a DC component, which is an average value of block data. The remaining 63 coefficients are called AC components.

In the quantization of the DCT coefficients, the DCT coefficients are linearly quantized by a quantizer using a quantization matrix where quantization step sizes different for the individual coefficients are set. It is to be noted that to control the amount of generated codes or the quality of an encoded image, a quantization matrix multiplied by an externally specified coefficient (scaling factor) stored in a reference table is used as an actual matrix value in the quantization. The 64 DCT coefficients are quantized to be integer values referring to the table. This quantization results in non-reversible compression. The contents of the reference table that is used in quantization are not specified in JPEG. The quantization table is prepared in consideration of human visual characteristics. As man is not so sensitive to visual information of high-frequency components, such high-frequency components will be quantized roughly.

In the entropy encoding, the difference between the DC component in a block and the quantized DC component in the left-hand adjoining block is computed and encoded first. This scheme is called DPCM. The AC components are transformed to have a linear arrangement by zigzag scanning. In entropy encoding in the baseline system, a Huffman coding scheme is employed. In the Huffman coding, it is determined whether or not each coefficient is zero, and the length of consecutive zero coefficients is reckoned as run length when a non-zero coefficient is detected, it is subjected to two-dimensional Huffman coding by combining the result of its quantization and the run length of the preceding zero coefficients. While Huffman coding of DC/AC components is based on a given Huffman coding table, the quantization matrix and Huffman coding table have no default values to provide the optimal performance matching with the conditions for the usage, and are transferred from a coder to a decoder when needed.

FIG. 13 presents a block diagram of a conventional image data compressing apparatus 10 that is based on the JPEG algorithm. In FIG. 13, reference numeral 11 denotes a frame memory where data of an original image is held. The image data in the frame memory 11 is output to a DCT computation section 12. The DCT computation section 12 performs DCT computation on the received data block by block and outputs the result to a quantizer 13. The quantizer 13 performs quantization on the computed data in accordance with the values on quantization tables (see FIGS. 15 and 16) in a quantization table RAM or a Huffman coder 14. The Huffman coder 14 performs Huffman coding on the output data of the quantizer 13 using a DC code amount memory 15 and an AC code amount memory 16. The total amount of codes generated is stored in a total-amount-of-generated-code (TAGC) memory 17. A CPU 18 performs the general control of those units, and performs control to prepare the optimal quantization tables and predict the amount of generated codes of each block. The latter two processes will be described later.

The Huffman coder 14 performs Huffman coding in the following two modes.

Mode 1: Huffman coding is performed on input data, and the number of bits generated for the DC component of each block is written in the DC code amount memory 15 at that time. The number of bits for the AC components is written in the AC code amount memory 16.

Mode 2: Huffman coding is performed on input data. In this coding, a predicted value for the amount of generated codes that is yielded by both the DC component of each block, written in the DC code amount memory 15, and the AC components, written in the AC code amount memory 16, is compared with the amount of actually generated codes, and if the actual amount of generated codes is greater than the predicted value, an EOB (End of Block) to make bits following a certain value all zero is generated, then the coding for that block is terminated. The number of the remaining bits is added to the predicted value for the next block.

FIG. 14 presents a block diagram of the quantizer 13. Referring to FIG. 14, the quantizer 13 comprises a quantization table RAM 21 for storing a Y (luminance information) quantization table (FIG. 15), a quantization table RAM 22 for storing a C (color information) quantization table (FIG. 16), and a multiplier 23 for obtaining a division value by dividing each frequency component yielded in the DCT computation, by a value in each quantization table (i.e., by multiplying the former component by a reciprocal of the latter value to accomplish the division) to accomplish quantization while changing the weighting. The quantization table RAMs 21 and 22 respectively correspond to the Y component and the R-Y and B-Y components.

FIG. 15 shows the Y quantization table, and FIG. 16 the C quantization table. Actually, the reciprocal values of those in the quantization tables are written in the quantization table RAMs 21 and 22. The quantizer 13 outputs the multiplication result.

The image data compressing apparatus 10 with the above-described structure prepares the optimal quantization tables and predicts the amount of generated codes for each block in the following manner.

i) First, prepare proper quantization tables and write them in the respective quantization table RAMs 21 and 22.

ii) Then, perform DCT→quantization→Huffman coding (mode 1).

iii) Refer to the total amount of generated codes stored in the TAGC memory 17, prepare new proper quantization tables based on that value, and write them in the respective quantization table RAMs 21 and 22 again.

iv) Then, perform DCT→quantization→Huffman coding (mode 1) again.

v) Prepare quantization tables which generate the target amount of generated codes, based on the total amount of generated codes obtained in ii) and the current total amount of generated codes, and write the tables in the quantization table RAMs 21 and 22. Subtract the total amount of codes generated by the DC component and the EOB length of each block from the target amount of generated codes and acquire the ratio of the resultant value to the total amount of codes generated by the AC components. Then, multiply the ratio by the amount of codes generated by the AC components of each block minus the EOB length, add the amount of codes generated by the DC component of each block plus the EOB length to the multiplication result, and write the resultant value as a predicted value for the amount of generated codes for each block in the AC code amount memory 16.

vi) Then, perform DCT→quantization→Huffman coding (mode 2).

However, the conventional image data compressing apparatus 10 controls the amount of generated codes in the above-described schemes ii), iv) and vi), so that the sequence of "DCT→quantization→Huffman coding" should be executed three times, which takes much time.

SUMMARY OF THE INVENTION

It is therefore an object of the present invention to provide an image data compressing apparatus and image data compressing method capable of controlling the amount of generated codes with less time.

There would be a difference (remaining bits) between the predicted value yielded in the conventional image data compressing apparatus 10 in the above-described scheme and the target amount of generated codes. The reason for the remainder is as follows. Actually, perfect division is not possible in the aforementioned computation, yielding a remainder. When the numeral represented by the remaining bits is rounded, the resultant value may become larger than the actual value by some bits due to a rounding error and the predicted value as a whole would be larger than the intended value by some bits (or some bytes) as a consequence. Since the predicted value exceeding the target value cannot be allowed, rounding is not actually performed and the remainder in the computation is basically cut off. If the remainder is to be cut off, as there are over 10,000 blocks, with an average of five bits per block becoming the remainder, for example, over 50,000 bits for the entire blocks would be generated as the remainder.

The conventional image data compressing apparatus 10 is designed to cut off the remaining bits or collect them in the upper left block. In the first case, this apparatus 10 cannot improve the image quality. In the second case, if the amount of generated codes is smaller than predicted, the image quality is higher than that obtained in the first case. If the amount of generated codes is larger than predicted, on the other hand, the amount of codes allocated for each block decreases, thus greatly deteriorating the image quality.

Accordingly, it is another object of the present invention to provide an image data compressing apparatus and image data compressing method capable of properly distributing the remainder of the amount of generated codes to improve the image quality.

To achieve the first object, according to the present invention, there is provided an image data compressing apparatus comprising:

transform means for transforming image data;

quantization table storage means for storing plural types of quantization tables used in quantization;

quantizing means for quantizing a signal output from the transform means based on the quantization tables; and coding means for coding components quantized by the quantizing means in accordance with a predicted amount of generated codes of each block, whereby the plural types of quantization tables are used to predict a change in an amount of generated codes caused by changing the quantization tables in a first compression and compression to a target amount of codes is performed in a second compression.

To achieve the second object, according to the present invention, there is provided an image data compressing apparatus comprising:

transform means for transforming image data;

quantization table storage means for storing quantization tables used in quantization;

quantizing means for quantizing a signal output from the transform means based on the quantization tables;

coding means for coding components quantized by the quantizing means in accordance with a predicted amount of generated codes of each block;

code amount storage means for storing amounts of codes of DC components and AC components generated in individual blocks at a coding time;

total-amount-of-generated-code computing means for computing total amounts of generated codes of the DC components and AC components;

total-amount-of-generated-code storage means for storing the total amounts of generated codes computed by the total-amount-of-generated-code computing means; and at least one of block distributing means including,
individual-block distributing means for acquiring a difference between a sum of predicted values computed by the total-amount-of-generated-code computing means and a target amount of generated codes as a remainder, and dividing the remainder by a total number of the blocks to distribute the remainder to the blocks, Y-block distributing means for distributing the remainder to those blocks of luminance information (Y), Y-, R-Y- and B-Y-block distributing means for distributing the remainder to left blocks of luminance information (Y) and color information (R-Y, B-Y) in a predetermined ratio, Y-left block distributing means for distributing the remainder to left blocks of luminance information (Y), and Y-upper-left block distributing means for distributing the remainder to upper left blocks of luminance information (Y).

With the first arrangement, image data is subjected to discrete cosine transform in the transform means and is then sent to the quantizing means.

The quantizing means quantizes a DCT computed output referring to the quantization tables, and sends the quantization result to the coding means. The coding means encodes the quantized data in accordance with a predicted amount of generated codes of each block. At the time of the coding, the amount of codes of the DC components and AC components generated in the individual blocks are stored in the code amount storage means. The total-amount-of-generated-code computing means computes the sum of the amount of codes of the DC and AC components and stores the sum in the total-amount-of-generated-code storage means.

In this case, plural types of quantization tables are used to predict a change in the amount of generated codes caused by changing the quantization tables in a first compression and compression to the target amount of codes is performed in a second compression.

Therefore, the operational sequences for coding control can be reduced, ensuring control on the amount of generated codes with less time.

Further, since the accurate code amount control can be performed in two compressions, this apparatus can be adapted for use in an electronic camera or the like which executes frame control.

With the second arrangement, image data is subjected to discrete cosine transform in the transform means and is then sent to the quantizing means.

The quantizing means quantizes a DCT computed output referring to the quantization tables, and sends the quantization result to the coding means. The coding means encodes the quantized data in accordance with a predicted amount of generated codes of each block. At the time of the coding, the amount of codes of the DC components and AC components generated in the individual blocks are stored in the code amount storage means. The total-amount-of-generated-code computing means computes the sum of the amount of codes of the DC and AC components and stores the sum in the total-amount-of-generated-code storage means.

The difference between the sum of computed predicted values and the amount of generated codes is acquired as the remainder. The remainder is distributed to the individual blocks first, and what has remained in the distribution is distributed to blocks of luminance information (Y). A further remainder is distributed to left blocks of luminance information (Y) and color information (R-Y, B-Y) in a given ratio. A further remainder is then distributed to left blocks of luminance information (Y). The final remainder is distributed to upper left blocks of luminance information (Y).

Accordingly, the remainder of the amount of generated codes is properly distributed, ensuring improved image quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 exemplifies the contents of the quantization tables in the image data compressing apparatus according to the first embodiment;

FIG. 12 presents a diagram for explaining an algorithm for predicting the amount of generated codes in the image data compressing apparatus according to the second embodiment;

FIG. 15 shows a Y quantization table in the conventional image data compressing apparatus; and FIG. 16 shows R-Y and B-Y quantization tables in the conventional image data compressing apparatus.

DETAILED DESCRIPTION OF THE PREFERRED EMBODIMENTS

Preferred embodiments of the present invention will now be described referring to the accompanying drawings.

Description of Principle

To begin with, the basic concept of the present invention will be discussed. An image data compressing apparatus embodying the present invention comprises a transform device such as a DCT computation device, storage devices for plural types of quantization tables, a quantizer that uses the storage devices while properly switching from one to another, a coder for performing coding (for example, Huffman coding) in accordance with the predicted amount of generated codes of each block, which is given previously, a storage device for storing the amount of codes of DC components and the amount of codes of AC components, generated in the individual blocks, a computation device for computing the total amount of generated codes of the DC components and the total amount of generated codes of the AC components for each properly selected quantization table, and a storage device for storing the computed total amounts of generated codes. Plural types of quantization tables are used to predict a change in the amount of generated codes that is caused by changing the quantization tables in the first compression, and compression to the target amount of codes is performed in a second compression. That is, two quantization tables are used in the first pass in the control of the amount of generated codes in the image data compressing apparatus of the present invention, thereby reducing the number of sequences of "DCT→quantization→Huffman coding" from three (conventional case) to two.

A specific scheme of using plural types of quantization tables in a first quantization will be described in detail in the following description of first and second embodiments.

First Embodiment

FIGS. 1 through 9 illustrate an image data compressing apparatus and image data compressing method according to the first embodiment of the present invention. In this embodiment, two types of quantization tables assigned checkerwise are used for each block.

Figure 1:
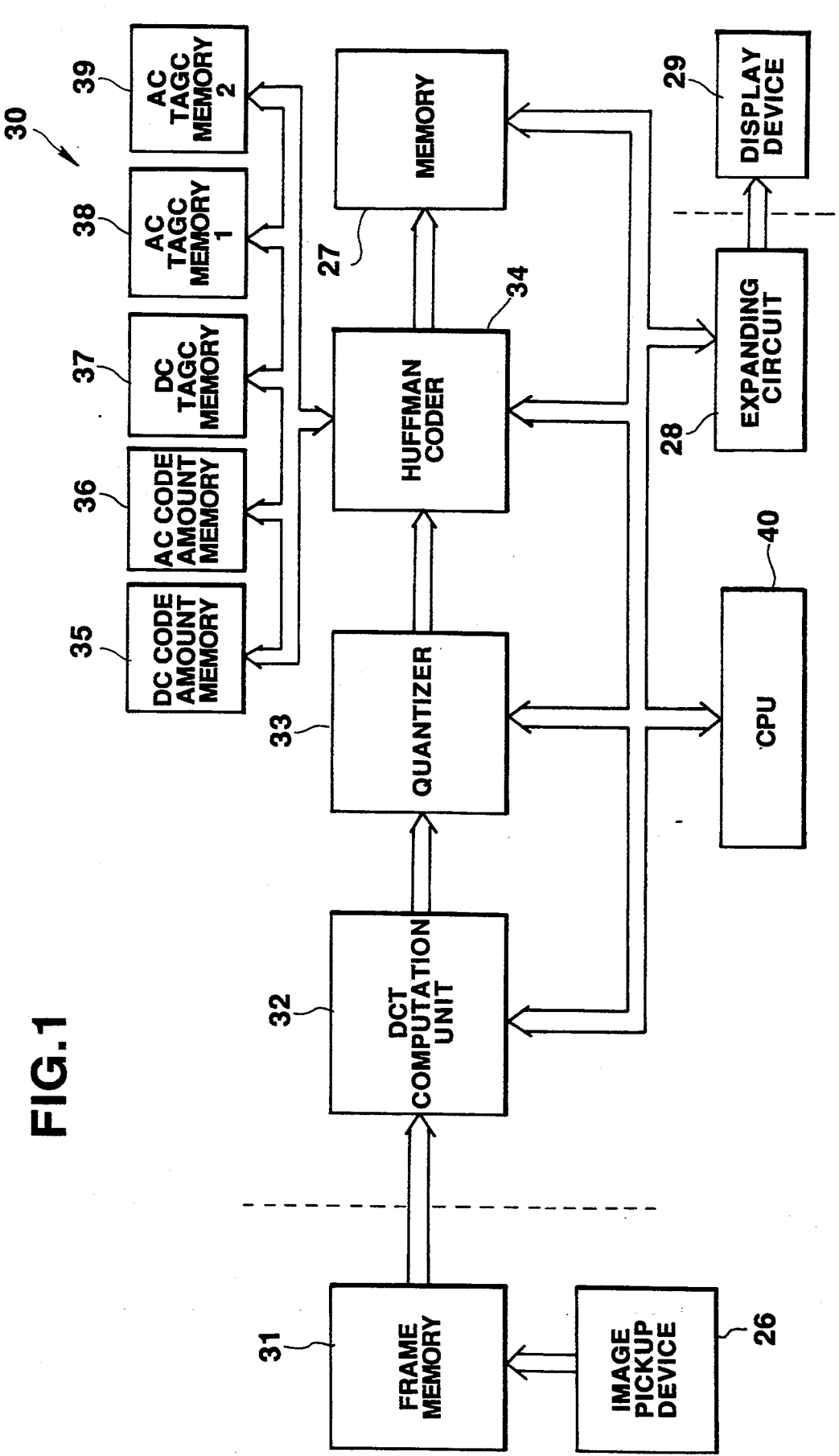
FIG. 1 is a block diagram of an image data compressing apparatus according to a first embodiment.

First, the structure will be described. FIG. 1 is a block diagram of an image data compressing apparatus 30. As illustrated, the image data compressing apparatus 30 comprises a frame memory 31 for storing original image data to be compressed, a DCT computation unit 32 for performing DCT computation in which image data from the frame memory 31 is subjected to two-dimensional DCT to obtain DCT coefficients, a quantizer 33 for quantizing the DCT output data in accordance with values from quantization table RAMs (to be described later), a Huffman coder 34 for performing Huffman coding on the output of the quantizer 33 in two modes 1 and 2, as in the prior art, using individual memories (35 to 39) to be described later, a DC code amount memory 35 for storing the amount of DC codes generated by DC components, an AC code amount memory 36 for storing the amount of AC codes generated by AC components, a DC total-amount-of-generated-code (TAGC) memory 37 for storing the sum of the amounts of codes generated by the DC components of the entire blocks, AC TAGC memories 38 and 39 for the respective tables, which store the sums of the amounts of codes generated by the AC components of those blocks quantized by respectively using the two types (Y and C) of quantization tables, and a CPU 40, which performs the general control of the above units, prepares quantization tables considered as optimal and computes a predicted value for the amount of generated codes of each block from time to time.

An image data generated from an image pickup device 26 is supplied to the frame memory 31. The image pickup device 26 is constituted by a CCD and the like. The image data compressed by the image data compressing apparatus 30 is stored in a memory 27 which is constituted by a semiconductor memory, an IC card, a floppy disk, an optical disk and the like.

In a reproduction mode, the compressed image data stored in the memory 27 is read out and supplied to an expansion circuit 28 under the control of the CPU 40. A decoding operation and an expansion operation are performed in the expansion circuit 28 to obtain expanded image data. The expanded image data is then supplied to a display device 29 constituted by a liquid crystal display unit and the like to display a reproduced image.

The image pickup device 26, expansion circuit 28, display device 29 and frame memory 31 may be composed of the image data compressing apparatus 30 as a unit apparatus or may be composed separately from the apparatus 30. When the one or more units 26, 28, 29 and 31 are provided externally from the apparatus 30, these units are connected for the apparatus 30 to transmitting and receiving data therebetween. An electronic still camera can be composed when the units 26, 28, 29 and 31 are composed of the image data compressing apparatus 30 as a unit apparatus.

The Huffman coder 34 performs Huffman coding on output data of the quantizer 33 using the DC code amount memory 35 and AC code amount memory 36. The Huffman coder 34 stores the sum of the amount of codes generated with respect to the DC components of the whole blocks in the DC TAGC memory 37, and stores the sums of the amounts of codes generated with respect to the AC components for each of two types of quantization tables 51 to 54 (to be described later), which are assigned in a checkered pattern (see FIGS. 3 and 4), in the respective AC TAGC memories 38 and 39.

The sum of the amount of codes generated with respect to the AC components of the quantized blocks is stored in the AC TAGC memory 38 using the quantization tables 51 and 52, and is stored in the AC TAGC memory 38 using the quantization tables 53 and 54. In mode b to be described later, a value is stored only in the AC TAGC memory 38, and nothing is written in the AC TAGC memory 39.

Figure 2:
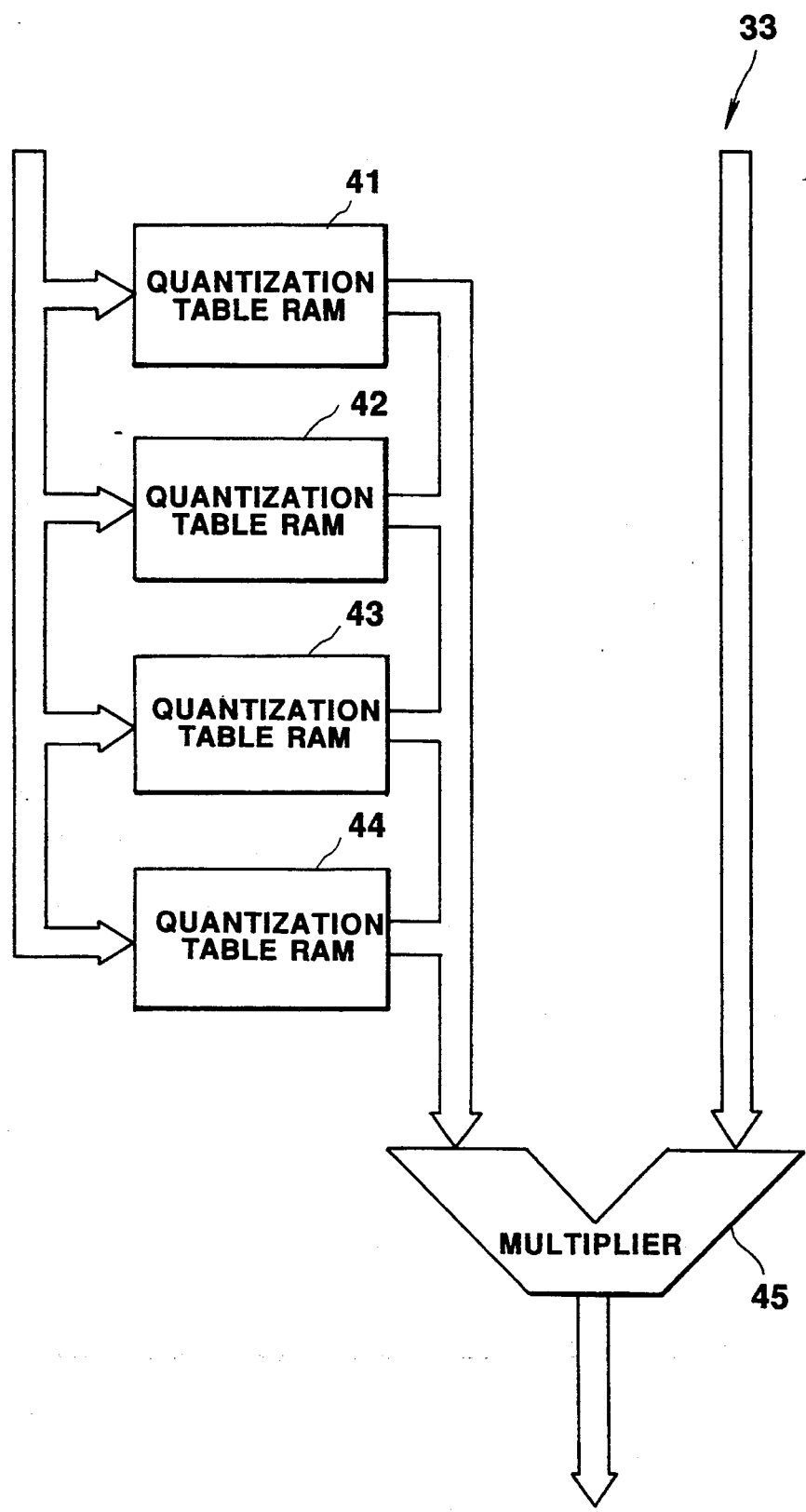
FIG. 2 is a block diagram of a quantizer in the image data compressing apparatus according to the first embodiment.

FIG. 2 presents a block diagram of the quantizer 33. Referring to FIG. 2, the quantizer 33 comprises a quantization table RAM 41 for storing the Y quantization table 51 assigned to one type of blocks in a checkered pattern of individual blocks for C, a quantization table RAM 43 for storing the Y quantization table 53 assigned to the other types of blocks in the checkered pattern, a quantization table RAM 42 for storing the R-Y, B-Y quantization table 52 assigned to one type of blocks in a checkered pattern of individual blocks for R-Y and B-Y, a quantization table RAM 44 for storing the R-Y, B-Y quantization table 54 in the other types of blocks in the checkered pattern for R-Y and B-Y, and a multiplier 45 for multiplying the result of the DCT computation by values of the quantization tables 51–54 (i.e., multiplying the former value by a reciprocal of the latter value to accomplish the division) to accomplish quantization while changing the weighting.

Figure 3:
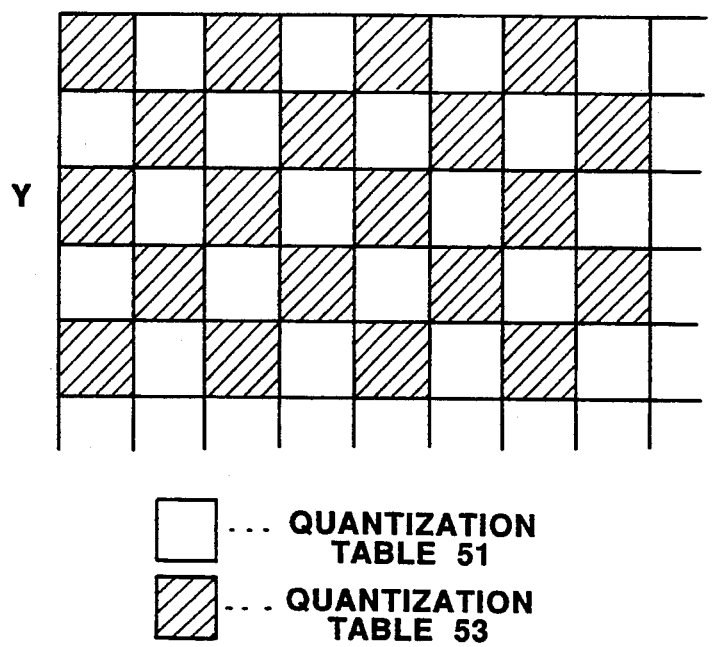
FIG. 3 shows a Y quantization table in the image data compressing apparatus according to the first embodiment.
Figure 4:
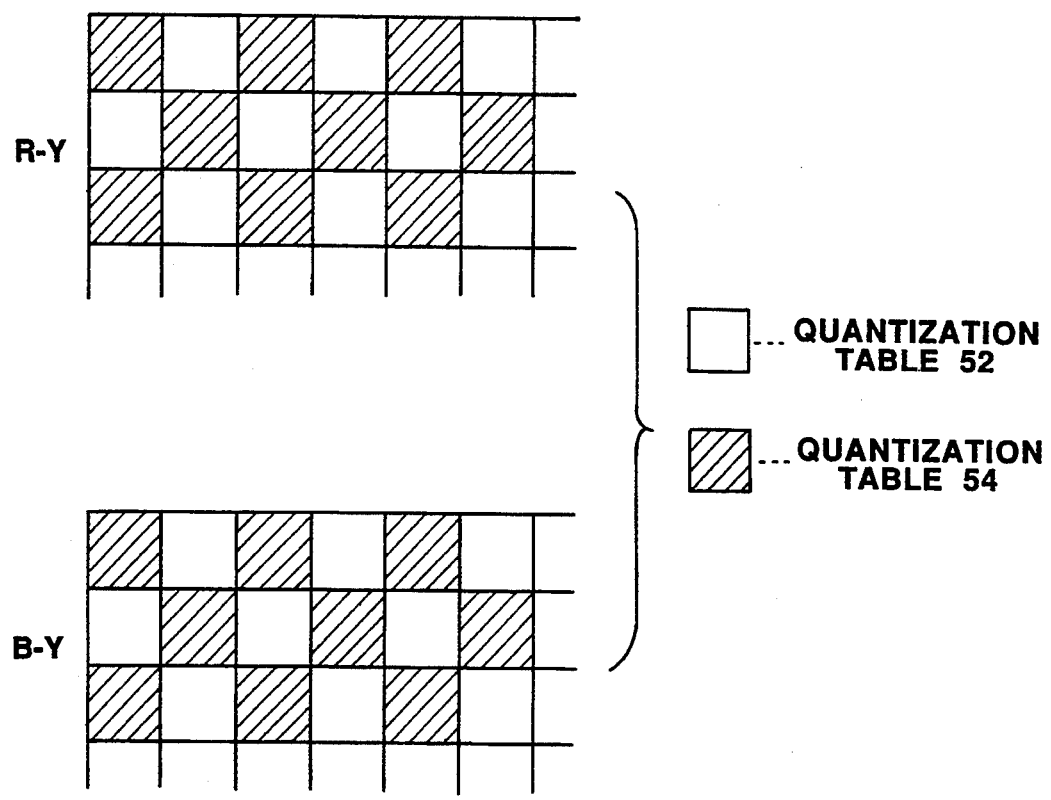
FIG. 4 shows R-Y and B-Y quantization tables in the image data compressing apparatus according to the first embodiment.

FIG. 3 illustrates the Y quantization tables 51 and 53 respectively stored in the quantization table RAMs 41 and 43, and FIG. 4 illustrates the quantization tables 52 and 54 respectively stored in the quantization table RAMs 42 and 44. As apparent from FIG. 3, the Y quantization table 51 and the Y quantization table 53 (see the hatched portions in FIG. 3) are assigned checkerwise for the individual blocks. In other words, while the individual blocks as a whole constitute a single Y quantization table in the prior art as shown in FIG. 15, the Y quantization table 53 is assigned to those hatched blocks of the individual blocks arranged in a checkered pattern and the Y quantization table 51 is assigned to the unhatched blocks in the checkered pattern in the present invention as shown in FIG. 3. Likewise, the R-Y, B-Y quantization table 54 is assigned to those hatched blocks of the individual blocks arranged in a checkered pattern and the R-Y, B-Y quantization table 52 is assigned to the unhatched blocks in the checkered pattern as shown in FIG. 4.

If the blocks are arranged in a checkered pattern, the number of blocks to which each quantization table is assigned is actually reduced to a half, so that the computed amount of generated codes becomes about a half. Therefore, the computed amount of generated codes is doubled before usage in this embodiment. By switching the quantization tables 51 and 53 from one to the other and the quantization tables 52 and 54 from one to the other, the tendency of the amounts of generated codes at two points (inclination in the linear case) based on the two selected tables is obtained, so that the scaling value corresponding to the computed amount of generated codes can be acquired in the first quantization.

It is to be noted that the quantization coefficients of the Y quantization table 51 (quantization table 1) for DC components should be the same as those of the Y quantization table 53 (quantization table 2) for DC components. The same is true of the R-Y, B-Y quantization tables 52 and 54. This condition is given because the difference between a DC component of a current block and that of the previous block is used at the time Huffman coding is performed. Since the same values are used, it is sufficient to predict the amount of generated codes of the AC components, thereby improving the prediction precision. If variable quantization coefficients are used, the DC component of one block may not be encoded in some case where encoding and decoding for that block and those following are not possible. The above condition prevents this shortcoming.

The Y quantization table 51 and R-Y, B-Y quantization table 52 used as the table 1 and the Y quantization table 53 and R-Y, B-Y quantization table 54 used as the table 2 have values as shown in, for example, FIG. 5. The quantization tables 51–54 stored in the respective quantization table RAMs 41–44 are selectively used for different components and blocks in the following manner.

Mode a: The Y quantization tables 51 and 53 are used for Y. Those tables 51 and 53 are selectively used for the individual blocks to provide a checkered pattern as shown in FIG. 4. The R-Y, B-Y quantization tables 52 and 54 are selective used for R-Y and B-Y in a checkered pattern as in the case of Y.

Mode b: The Y quantization table 51 is used for Y. The R-Y, B-Y quantization table 52 is used for R-Y and B-Y. In this case, no table switching on a block-by-block base will be conducted.

The operation of this embodiment will now be described.

General Operation

It is assumed that data of an original image is held in the frame memory 31. The DCT computation unit performs DCT computation on image data read from the frame memory 31, and sends the DCT output to the quantizer 33. The quantizer 33 performs quantization on the output data of the DCT computation unit 32 in accordance with values of the quantization table RAMs 41–44, and outputs the computation result to the Huffman coder 34. The Huffman coder 34 performs Huffman coding on the quantized data using the DC code amount memory 35 and the AC code amount memory 36, stores the sum of the amounts of codes generated with respect to the DC components of the whole blocks in the DC TAGC memory 37, and writes the sums of the amounts of codes generated with respect to the AC components for the two types of quantization tables 51–54 selectively used checkerwise in the respective AC TAGC memories 38 and 39. In this case, the sum of the amounts of generated codes of the blocks using the Y quantization table 51 (see the unhatched portions in FIG. 3) is written in the AC TAGC memory 38, while the sum of the amounts of generated codes of the blocks using the Y quantization table 53 (see the hatched portions in FIG. 3) is written in the AC TAGC memory 39.

The CPU 40 operates the above individual units as follows to control the amount of generated codes.

i) First, prepare proper quantization tables to match with the target sum of the amounts of generated codes, and write its reciprocal in the associated quantization table 51, 52, 53 or 54. FIG. 5 shows an example of the contents of the quantization tables 51–54 for 1 bpp.

ii) Then, perform DCT→quantization (mode a)→Huffman coding (mode 1).

iii) Prepare proper quantization tables to generate the target amount of generated codes and predict the amounts of generated codes of the AC and DC components of each block at that time in accordance with an algorithm to be described later. Then, write the values in the associated quantization tables 51 and 52, and the DC code amount memory 35 and AC code amount memory 36.

iv) Then, execute DCT→quantization (mode b)→Huffman coding (mode 2).

Algorithm for Predicting the Amount of Generated Codes.

An algorithm for preparing the quantization tables will be described first.

(1) The ways to prepare quantization tables which allow the amount of generated codes to be linear is determined and are numbered in advance. The numbers are called scalings. For instance, there are 256 numbers ranging from 0 to 255, and the amount of generated codes increases linearly from 0 to 255. The prepared quantization tables should have the same quantization coefficient for the DC component in each corresponding item of the tables. In other words, for any scaling, the quantization coefficient for the DC component of Y (quantization coefficients for B-Y and R-Y) should always be a constant. (The quantization coefficient for Y should not necessarily match with that for B-Y and R-Y.)

(2) The proper two scalings are selected for the target amount of generated codes (CDN) to prepare the quantization tables, the reciprocals of those numbers are written in the quantization tables 51, 52, 53 and 54 to perform quantization (mode a) and Huffman coding (mode 1). FIG. 5 exemplifies the contents of the thus prepared quantization table.

(3) Given that the scalings selected first are Sb and Sh, the total amount of generated DC codes in the DC TAGC memory 37 is DCall, and the total amounts of generated AC codes in the AC TAGC memories 38 and 39 corresponding to Sb and Sh are ACsb and ACsh. The desired scalings can be obtained from, for example, an equation 1 below.

$$Sb + \frac{(CDN - DCall - ACsb \times 2) \times (Sh - Sb)}{(ACsh - ACsb) \times 2} \quad (1)$$

Figure 6:
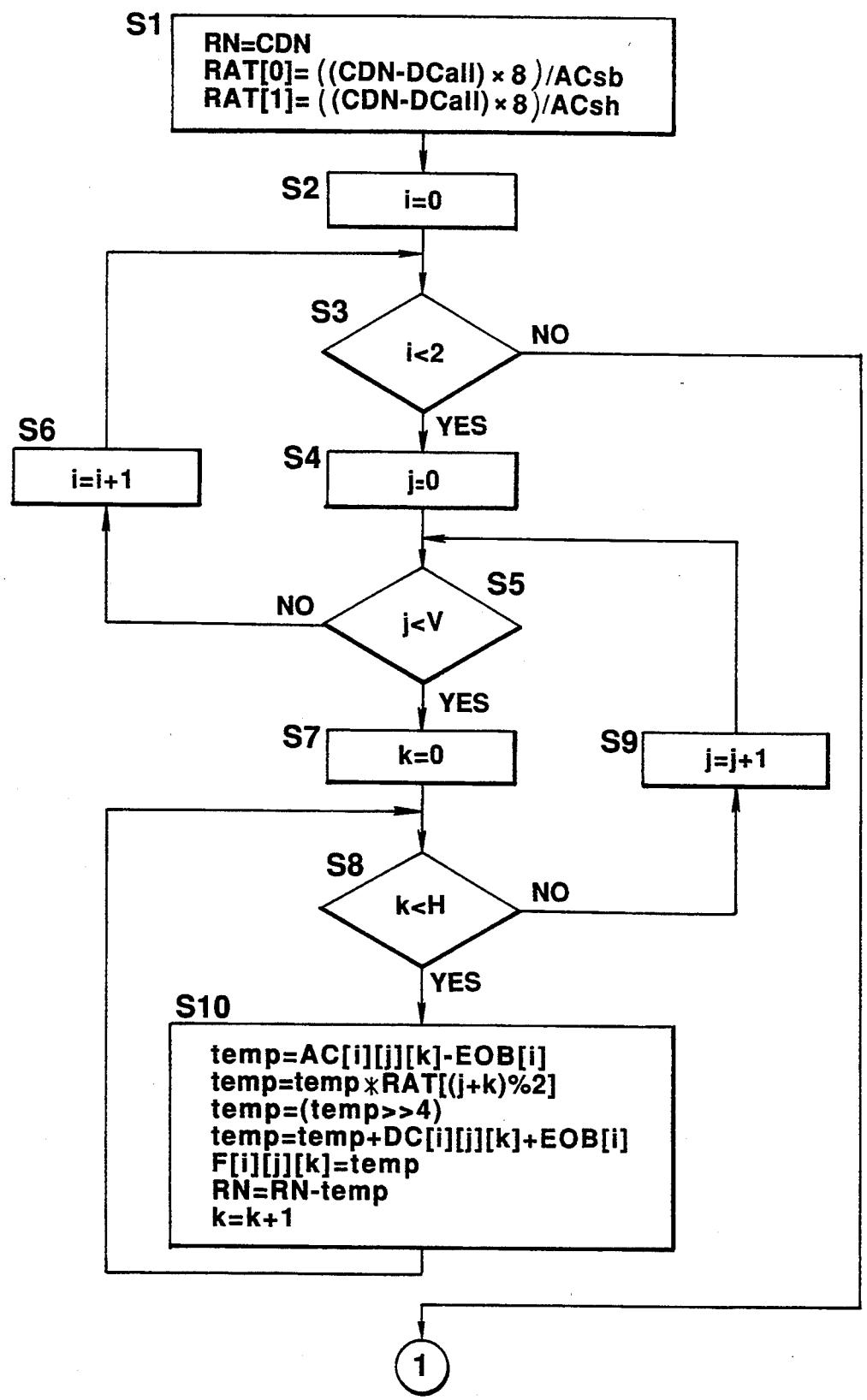
FIGS. 6 through 8 present flowcharts illustrating a routine for predicting the amount of generated codes in the image data compressing apparatus according to the first embodiment.
Figure 7:
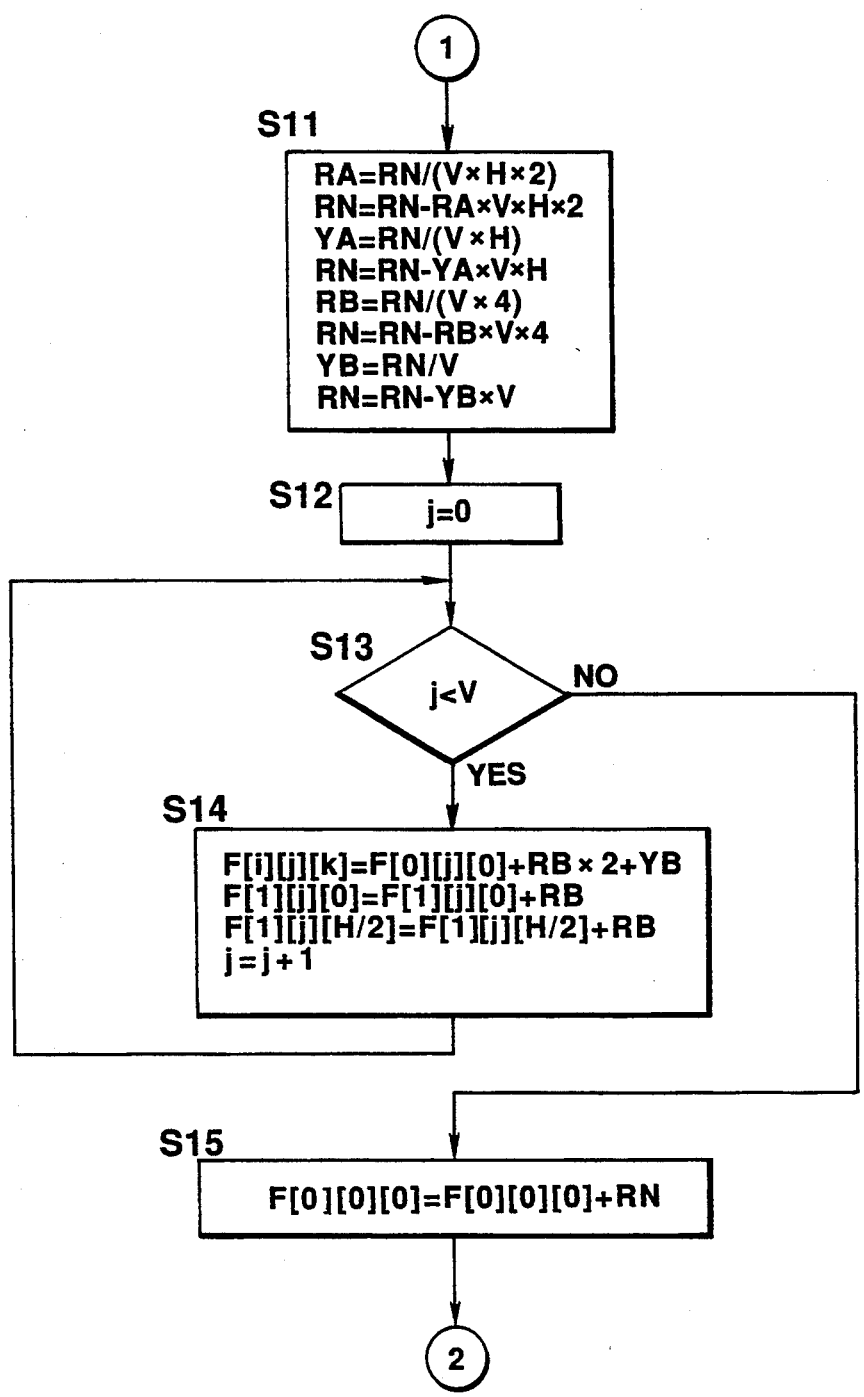
Figure 8:
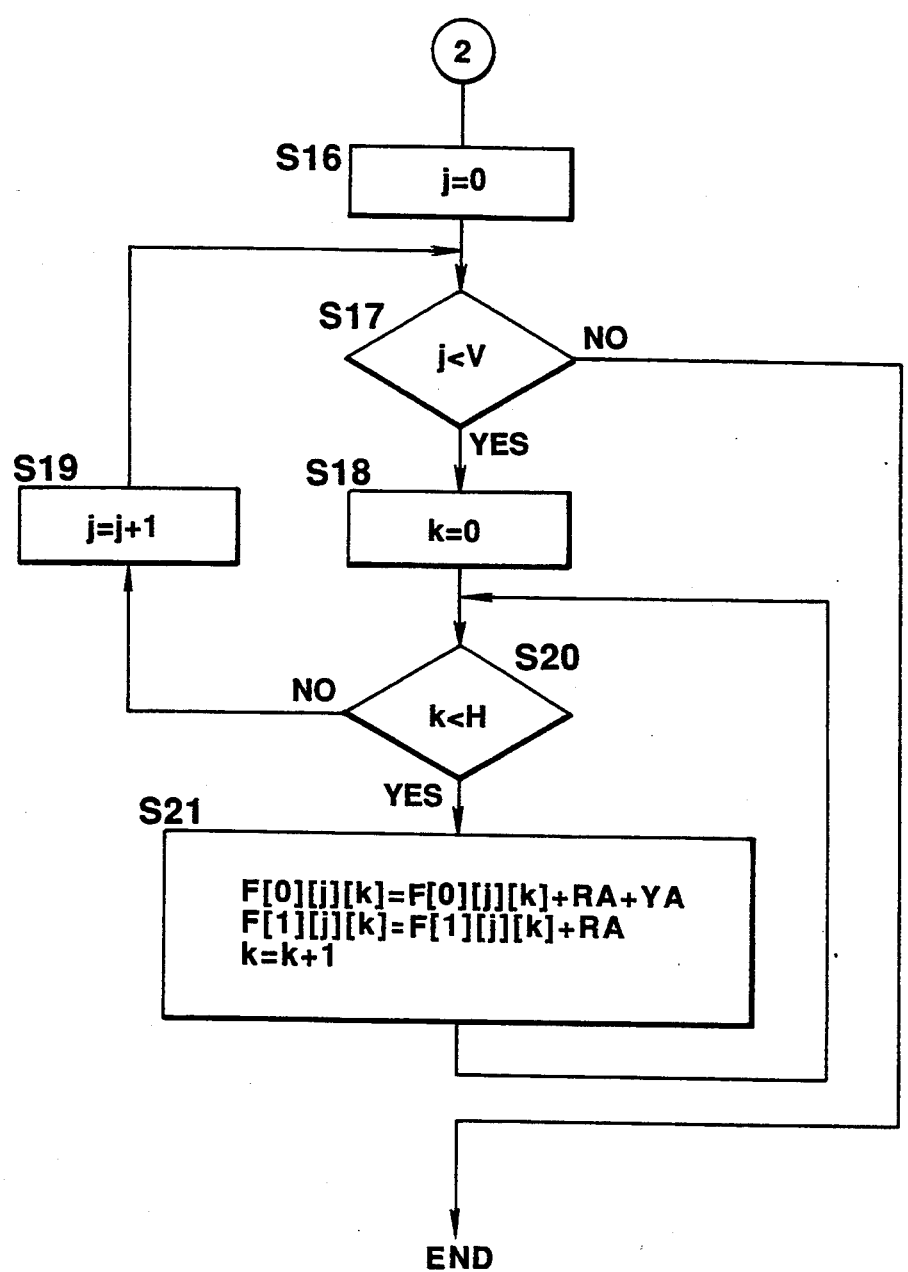

Then, the amount of generated codes for each block is predicted by the following algorithm. FIGS. 6 through 8 present flowcharts illustrating a routine for predicting the amount of generated codes for each block, and the relationship between variables used in the flowcharts is given below.

CDN: target number of bits
RN: number of undistributed bits
RAT [0], RAT[1]: 16 times the predicted values for the ratios of the amount of generated codes of AC components for the target number of bits to two times the total amounts of generated codes which are obtained when the quantization tables 51 and 52 and the quantization tables 53 and 54 are used
EOB[0], EOB[1]:
0=EOB length of Y
1=EOB length of C
AC[i][j][k]:
i→0/1=Y/C
j, k; amount of generated AC codes for the block at the j-th row and k-th column
DC[i][j][k]:
i→0/1=Y/C
j, k; amount of generated DC codes for the block at the j-th row and k-th column
F[i][j][k]:
i→0/1=Y/C
j, k; predicted value for the amount of generated AC codes for the block at the j-th row and k-th column
RA: number of bits to be distributed to all blocks
YA: number of bits to be distributed to blocks of Y
RB: number of bits to be distributed to all left-hand blocks
YB: number of bits to be distributed to left-hand blocks of Y Before going to the explanation of the flowcharts given in FIGS. 6 to 8, the algorithm of the entire flow will be described briefly.

(I) The ratio of the target amount of generated codes minus the amount of DC codes generated in the first attempt to the sum of the AC components generated by each table (ACsb, ACsh) is acquired.

(II) The EOB length (EOB[0], EOB[1]) is subtracted from the amount of AC codes actually generated in each block, the resultant value is multiplied by the ratio acquired in (I) above in accordance with the quantization tables used at a time, and EOB and the amount of generated DC codes acquired in the first attempt are added to the resultant value to be a temporary predicted value.

(III) The difference between the sum of the predicted values acquired in (II) above and the target amount of generated codes is obtained, and is allocated to the individual blocks as follows.

a) The remainder is divided by the number of total blocks and the quotients or sub remainders are evenly distributed to the individual blocks.

b) The further remainder is divided by the number of blocks of Y and the sub remainders are evenly distributed only to the blocks of Y.

c) The further remainder is divided by four times the number of blocks in the V direction and the sub remainders are distributed to the leftmost blocks of Y, R-Y and B-Y in the ratio of 2:1:1.

d) The further remainder is evenly distributed to the leftmost blocks of Y.

e) The further remainder is added to the upper left block of Y.

The predicted value for the amount of generated codes for each block is obtained through the above algorithm.

As ACsh and ACsb are each a half of the number of blocks of one screen, they are each considered as about ½ of the number obtained when the processing for one screen is executed. Since RAT[0] and RAT[1] are (CDN−DCall)×8 divided by ACsb and ACsh, respectively, they are 16 times the actual values, i.e., values acquired by shifting the binary point by four bits.

The above will be described more specifically. Referring to FIGS. 6 to 8, the number of undistributed bits RN is set to the target number of bits CDN (RN=CDN), and the ratios RAT[0] and RAT[1] of the target bit number CDN minus the total amount of codes of the DC components, DCall, generated in the first attempt to the sums (ACsb, ACsh) of the AC components generated by the individual tables are computed (RAT[0]=(CDN−DCall)×8/ACsb, RAT[1]=(CDN−DCall)×8/ACsh) in step S1. The value (CDN−DCall) is multiplied by "8" here to shift the binary point to maintain the calculation accuracy, and the multiplication is not essential. For instance, if the compression/expansion program is written in C language, a fractional portion in a division in C language is cut off; therefore, (CDN−DCall) is multiplied by a proper value.

Figure 9:
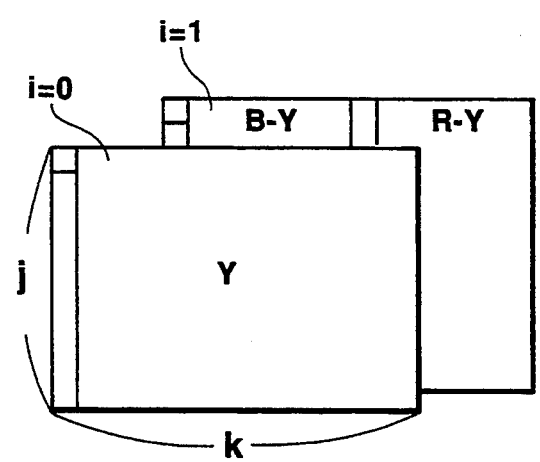
FIG. 9 is a diagram showing the structures of Y, B-Y and R-Y blocks in the image data compressing apparatus according to the first embodiment.

Then, bank i indicating a block of Y or C is set to 0 (i=0) in subsequent step S2, and it is determined if bank i is smaller than 2 (i<2) in step S3. For color (C), sampling is doubled in the horizontal direction, so that bank 1 plus bank 2 is equal to the size of Y. Therefore, the subsequence processing is repeated using the combination of banks 1 and 2 until bank i becomes 2. FIG. 9 illustrates the structures of Y, B-Y and R-Y blocks each specified to have j rows and k columns. When bank i is smaller than 2, the number of blocks j in the vertical direction is set to 0 (j=0) in step S4, and it is then determined in step S5 if the number of blocks j in the vertical direction is smaller than a predetermined number of blocks V in the vertical direction (j<V?). If the number of blocks j in the vertical direction is equal to or greater than the predetermined number of blocks V in the vertical direction, bank i is incremented (i=i+1) in step S6 before returning to step S3. If the number of blocks j in the vertical direction is smaller than the predetermined number of blocks V in the vertical direction, the number of blocks k in the horizontal direction is set to 0 (k=0) in step S7, and it is then determined in step S8 if the number of blocks k in the horizontal direction is smaller than a predetermined number of blocks H in the horizontal direction (k<H?). If the number of blocks k in the horizontal direction is equal to or greater than the predetermined number of blocks H in the horizontal direction, the number of blocks j in the vertical direction is incremented (j=j+1) in step S9 before returning to step S5. For instance, if the number of blocks V in the vertical direction is 60, the number of blocks j in the vertical direction, which has been initialized to 0, incremented from j=0 up to j=60, a and when j=60, similar decision is made for the horizontal direction in the processes starting from step S7. Accordingly, the processes of the next step S10 are repeated until the numbers of blocks in the vertical and horizontal directions reach specified values, and when bank i becomes 2, the processing leaves the flow of FIG. 6 and advances to step S11 in FIG. 7.

The following processes are executed in step S10. First, the EOB length EOB[i] corresponding to each item is subtracted from the amount of codes actually generated in the individual blocks AC[i][j][k] and the result is stored in a temporary memory, temp (temp=AC[i][j][k]−EOB[i]). The reason for this subtraction is that EOB will be added in a later process to prevent overflow so that this EOB length is to be subtracted in advance. Further, the contents of the temp is multiplied by a predetermined ratio RAT to be a new temp value (temp=temp→RAT[(j+k) %2]. Here, (j+k) %2 is for switching 0 and 1 in a checkered pattern (see FIGS. 3 and 4) in the individual blocks, %2 indicates the remainder of division by 2 (which becomes either 0 or 1). Accordingly, it is determined which ratio RAT of the checkered pattern is to be used. Further, the value of this temporary memory temp is shifted to the left by four bits (temp=(temp>>4). The reason for the 4-bit leftward shifting is to correct a change in gain which is caused by the multiplication of RAT[0] and RAT[1] by 16 in step S1 in order to improve the accuracy at the time computation involving RAT[0] and RAT[1] is performed. Furthermore, the amount of generated DC codes, DC[i][j][k], acquired in the first attempt and EOB[i] corresponding to the item are added to the value of this temporary memory temp to be a new temporary value (temp=DC[i][j][k]+EOB[i]). This new temporary value is set to F[i][j][k] (F[i][j][k]=temp). This F[i][j][k] is the actual predicted value for the amount of generated codes. The number of undistributed bits (remaining bits) RN is the number of previously undistributed bits RN minus the obtained temporary value (RN=RN−temp). Then, the number of blocks k in the horizontal direction is incremented (k=k+1), terminating the processing of step S10, and the flow returns to step S8.

The predicted value for the amount of generated codes F[i][j][k] for the individual blocks can be attained through the flow of FIG. 6.

The algorithm of FIG. 6 may be sufficient for a compressing apparatus with extremely high computation accuracy (for example, image data compressing apparatus using FPU (Floating Processing Unit)). According to this embodiment, however, the algorithms shown in FIGS. 7 and 8 are employed to allocate the remainder to provide a highly accurate predicted value for the amount of generated codes. The reason for the remainder is as follows. Actually, perfect division is not possible in the aforementioned computation, yielding a remainder. When the computation of the aforementioned ratios is performed, the resultant value may become larger than the actual value by some bits due to a rounding error and the predicted value as a whole would be larger than the intended value by some bits (or some bytes) as a consequence. Since the predicted value exceeding the target value cannot be allowed, rounding is not actually performed and the remainder in the computation is basically cut off. If the remainder is to be cut off, as there are over 10,000 blocks, with an average of five bits per block becoming the remainder, for example, over 50,000 bits for the entire blocks would be generated as the remainder. In this embodiment, this remainder is properly distributed using the algorithms shown in FIGS. 7 and 8 to significantly improve the image quality.

In FIG. 7, the following processes are performed in step S11. First, the number of undistributed bits RN is divided by the number of the total blocks (V×H×2) to acquire the number of bits RA to be distributed to the whole blocks (RA=RN/(V×H×2)). Given that in FIG. 9, the block Y consists of 100 bits, blocks B-Y and R-Y each consist of 50 bits and the number of remaining bits is 380, the remainder 380 is divided by the number of the total blocks (100+50+50) and the resultant remainder is cut off as expressed in the following equation 2, to acquire the number of bits RA (for example, 1 bit) to be distributed to the individual blocks.

$$380/(100+50+50)=1=RA \qquad (2)$$

The number of bits to be distributed to the individual blocks (RA×V×H×2) is subtracted from the number of the original undistributed bits RN to yield the number of remaining bits RN which could not be distributed in the above even distribution (RN=RN−RA×V×H×2).

The number of remaining bits RN that could not be distributed in the above even distribution is divided by the number of blocks Y, (V×H), to acquire the number of bits to be distributed only to blocks Y (YA=RN/(V×H)). That is, Y and color (C) are not given the same weighting, but more codes are allocated to Y to provide a clearer image. Therefore, the number of remaining bits RN is distributed only to blocks Y. In this example, YA=RN/(V×H)=180/100.

The number of bits to be distributed only to the blocks Y (YA×V×H) is subtracted from the number of the bits RN that has remained in the even distribution to the individual blocks to yield the number of remaining bits RN which could not be distributed in the above even distribution only to the blocks Y (RN=RN−YA×V×H). In this example, RN=180−100.

Although the remainder is evenly distributed only to blocks Y in the above, there may be a further remainder. Thus, the number of remaining bits RN which could not be distributed in the distribution to Y is divided by four times the number of blocks in the vertical direction to yield the number of bits RB to be distributed to the leftmost blocks of Y, R-Y and B-Y in the ratio of 2:1:1 (RB=RN/(V×4). Normally, the processing is performed block by block starting from the upper left block to the blocks in the horizontal direction. Even when the processing comes to the lower right block and there are a sufficient amount of bits remaining, the proper distribution is no longer possible. In this embodiment, therefore, the remainder is distributed to the leftmost blocks. At this time, to give more codes to Y, the remainder is distributed to the leftmost blocks Y, R-Y and B-Y in the ratio of 2:1:1 so that twice as much as the codes given to R-Y and B-Y will be given to Y. To accomplish this distribution, the number RN is divided by (V×4). When V=10 in this example, RB=80/(10×2+10+10)=2.

The number of bits to be distributed to all the leftmost blocks (RA×4×4) is subtracted from the number of the bits RN that has remained in the distribution to the blocks Y to yield the number of remaining bits RN which could not be distributed in the above distribution to the leftmost blocks (RN=RN−RB×V×4).

Although the remainder is distributed to the leftmost blocks Y, R-Y and B-Y in the ratio of 2:1:1, there may be a further remainder. Thus, the number of remaining bits RN which could not be distributed is divided by the number of blocks in the V direction to yield the number of bits YB to be evenly distributed to the leftmost blocks of Y (YB=RN/V). The number of bits to be distributed to all the leftmost blocks of Y (YB×V) is subtracted from the number of the bits RN that has remained in the distribution to the leftmost blocks Y, R-Y and B-Y to yield the number of remaining bits RN which could not be distributed in the even distribution to the leftmost blocks of Y (RN=RN−YB×V).

If there still is a remainder after the even distribution to the leftmost blocks of Y, that remainder is added to the upper left block of Y in step S15 (which will be discussed later).

After the processes of step S11 are executed in the above manner, the flow goes to step S12. In step S12, the number of blocks j in the vertical direction is set to 0 (j=0) to execute the processing in the vertical direction. In step S13, it is determined if the number of blocks j in the vertical direction is smaller than a predetermined number of blocks V in the vertical direction (j<V?). If the number of blocks j in the vertical direction is less than the predetermined number of blocks V in the vertical direction, the predicted value for the amount of generated codes F[i][j][k] is acquired and the number of blocks j in the vertical direction is incremented (j=j+1) in step S14 before returning to step S13. Here, [i] in F[i][j][k] is a bank and i=0 means Y and i=1 means B-Y and R-Y. Further, [i] is the vertical direction (V) and [k] is the horizontal direction (H). In this case, the predicted value for the amount of generated codes of Y, F[0][j][0], is F[0][j][0] that has been acquired in the first attempt to which two times the number of bits RB to be distributed as a remainder to all the leftmost blocks and the number of bits YB to be distributed to the left blocks of Y are added (F[0][j][0]=F[0][j][0]+RB×2+YB). Further, the predicted value for the amount of generated codes of B-Y, F[1][j][0], is F[1][j][0] that has been acquired in the first attempt to which the number of bits RB to be distributed as a remainder to all the leftmost blocks is added (F[1][j][0]=F[1][j][0]+RB). Furthermore, the predicted value for the amount of generated codes of R-Y, F[1][j][H/2], is F[1][j][H/2] that has been acquired in the first attempt to which the number of bits RB to be distributed as a remainder to all the leftmost blocks is added (F[1][j][H/2]=F[1][j][H/2])+RB. Here, as two B-Y are equivalent to a single Y as shown in FIG. 9, [k] in the predicted value for the amount of generated codes of R-Y is expressed by [H/2]. In the above manner, the predicted value for the amount of generated codes F[i][j][k] is computed until the number of blocks j in the vertical direction becomes the predetermined block number V in the vertical direction in the loop of steps S13 and S14, so that the whole remainder is allocated to the left blocks. If j becomes equal to or greater than the predetermined block number V, it is considered that the processing for the whole blocks in the vertical direction is completed and the final remainder RN is added to the predicted value for the amount of generated codes for the left blocks, F[0][0][0], (F[0][0][0]=F[0][0][0]+RN) in step S15 before the flow advances to step S16 in FIG. 8.

In the flow of FIG. 8, even distribution of the aforementioned remainder to the whole blocks and even distribution of the remainder only to the blocks of Y are carried out. The number of blocks j in the vertical direction is set to 0 (j=0) in step S16, and it is then determined in step S17 if the number of blocks j in the vertical direction is smaller than the predetermined block number V in the vertical direction (j<V?). If j is smaller than V, the number of blocks k in the horizontal direction is set to 0 (k=0) in step S18, and it is then determined in step S20 if this number of blocks k in the horizontal direction is smaller than the predetermined number of blocks H in the horizontal direction (k<H?). When k is equal to or greater than H, the number of blocks j in the vertical direction is incremented (j=j+1) in step S19 before returning to step S17. When k is smaller than H, the flow advances to step S21.

In step S21, the number of bits RA to be distributed to all the blocks and the number of bits YA to be distributed to the blocks of Y are added to the predicted value for the amount of generated codes of Y, F[0][j][k], which has already been computed in the previous processing to yield the predicted value for the amount of generated codes of Y, F[0][j][k] (F[0][j][k]=F[0][j][k]+RA+YA), the number of bits RA to be distributed to all the blocks and the number of bits YA to be distributed to the blocks of C are added to the predicted value for the amount of generated codes of Y, F[1][j][k], which has already been computed in the previous step to yield the predicted value for the amount of generated codes of Y, F[1][j][k], (F[1][j][k]=F[1][j][k]+RA+YA), and the number of blocks k in the horizontal direction is incremented (k=k+1) before returning to step S20.

when the above-described steps are repeated and when the number of blocks j in the vertical direction becomes V or greater in step S17, it is considered that the computation of the predicted value for the amount of generated codes for all the blocks Y and C is completed, and the this routine will be terminated.

As described above, the image data compressing apparatus 30 of the first embodiment comprises the DC code amount memory 35 for storing the amount of DC codes generated by DC components, the AC code amount memory 36 for storing the amount of AC codes generated by AC components, the DC TAGC memory 37 for storing the sum of the amounts of codes generated by the DC components of the entire blocks, the AC TAGC memories 38 and 39 for the respective tables, which stores the sums of the amounts of codes generated by the AC components of those blocks quantized by respectively using the two types (Y and C) of quantization tables, and the Huffman coder 34 for performing Huffman coding on output data of the quantizer 33 using the DC code amount memory 35 and AC code amount memory 36. The Huffman coder 34 stores the sum of the amount of codes generated by the DC components of the whole blocks in the DC TAGC memory 37, and stores the sums of the amounts of codes generated by the AC components for each of two types of quantization tables 51 to 54 which are assigned in a checkered pattern in the respective AC TAGC memories 38 and 39. Two quantization tables 51 and 53 or 52 and 54 are used in the first compression to predict a change in the amount of generated codes that is caused by the switching of the quantization tables, and the optimal quantization tables for generation of the target amount of generated codes are prepared accordingly. Therefore, the number of sequences of "DCT→quantization→Huffman coding" is reduced from three (conventional case) to two in this embodiment, thus accomplishing faster processing. The image data thus compressed is stored in the memory 27. The stored image data is read out from the memory 27 in a reproducing mode to be decoded and expanded in the expanding circuit 28. The expanded image data is displayed on the display device 29.

As plural types of quantization tables are used for Y and C in a single quantization, the number of sequences can be reduced by one, achieving the high-speed processing, which is advantageous in applying the present apparatus to the code amount control in image compression.

Although two types of quantization tables assigned to the individual blocks in a checkered pattern are used, any number and types of quantization tables can be used as long as they are used in a single quantization.

The methods of preparing the quantization tables, the number of the tables and the values of the tables, which have been discussed in the foregoing description, are not restrictive but take any number and values.

Second Embodiment

Figure 10:
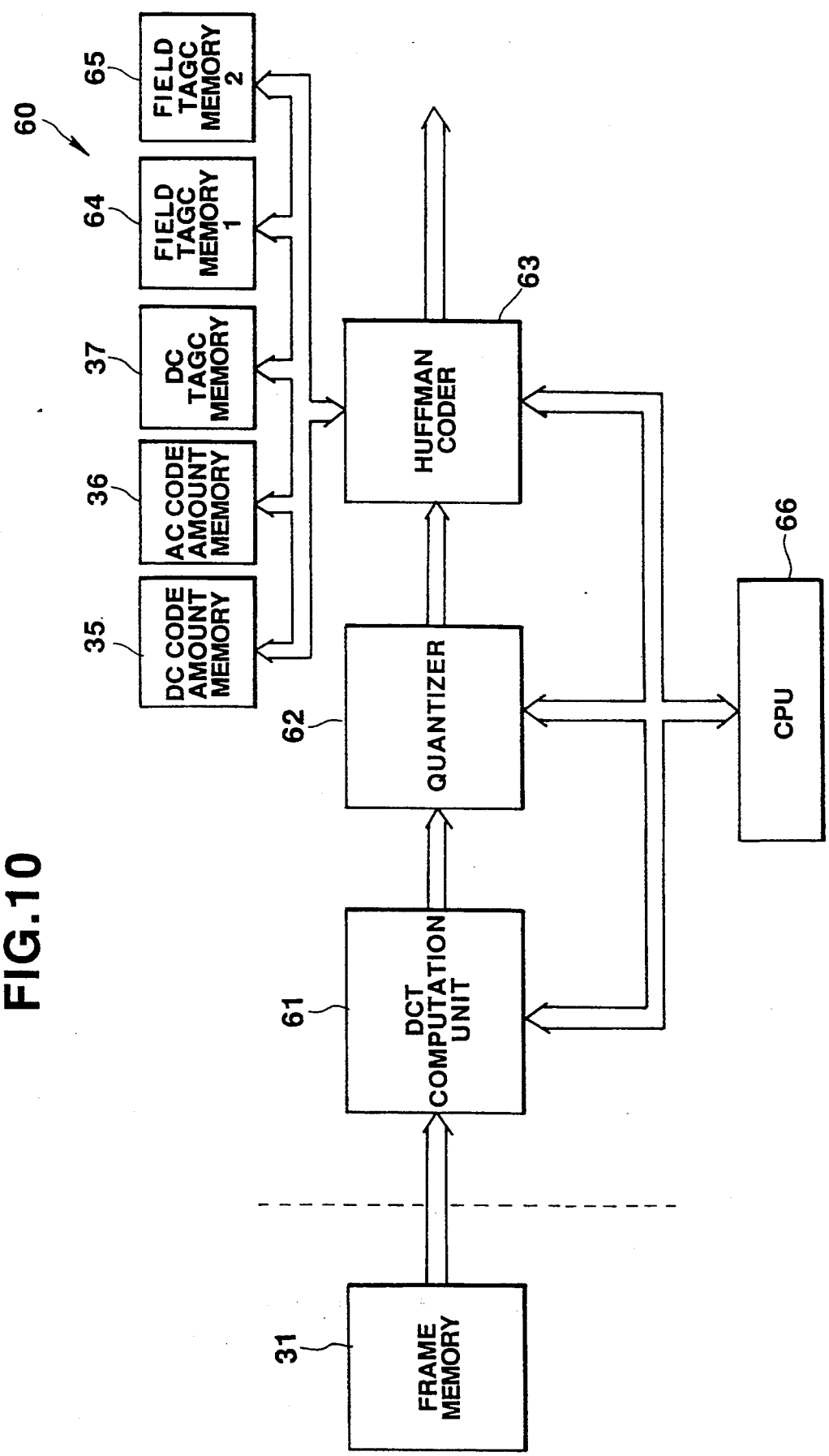
FIG. 10 is a block diagram of an image data compressing apparatus according to a second embodiment.
Figure 11:
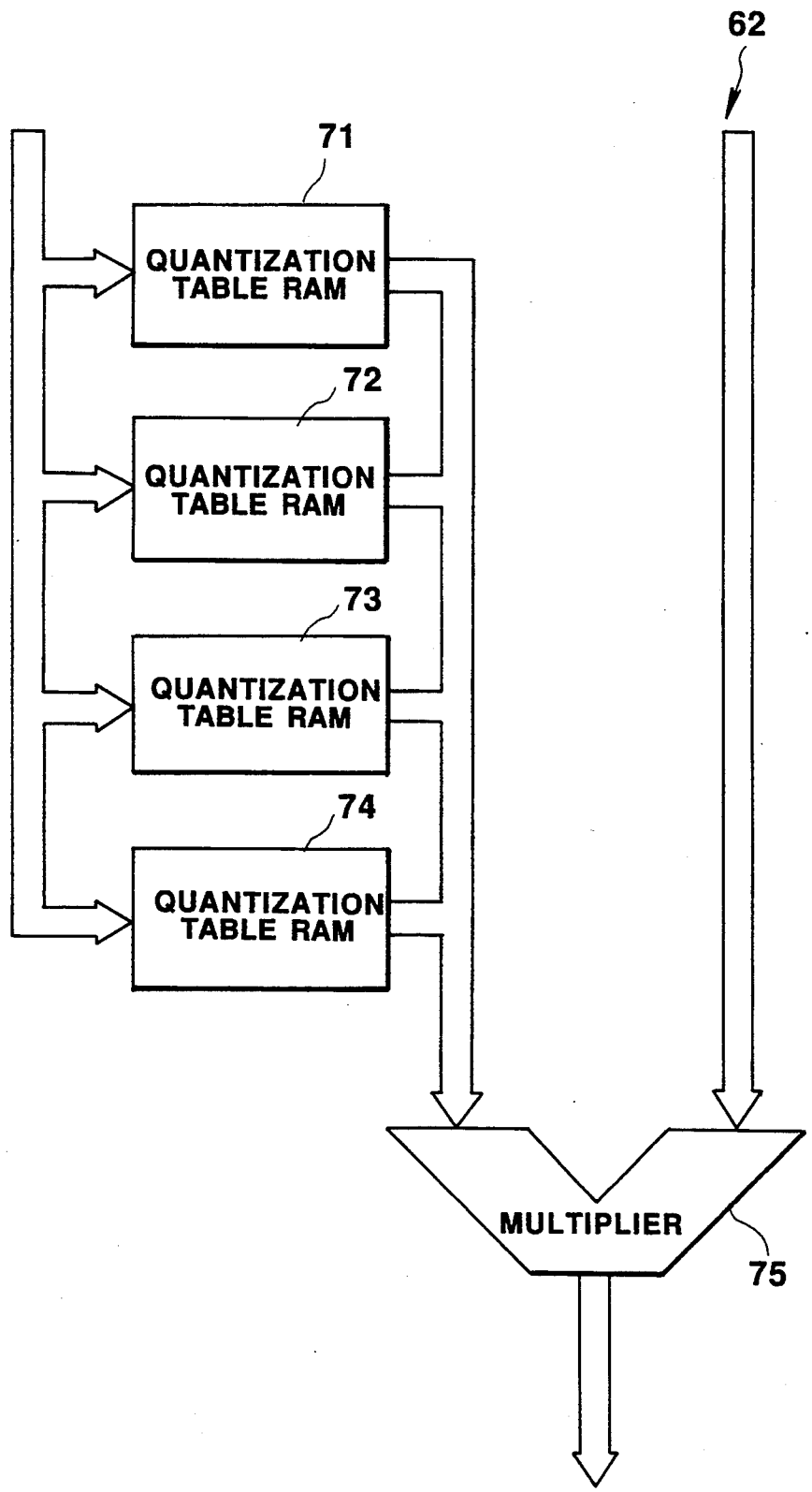
FIG. 11 is a block diagram of a quantizer in the image data compressing apparatus according to the second embodiment.
Figure 13:
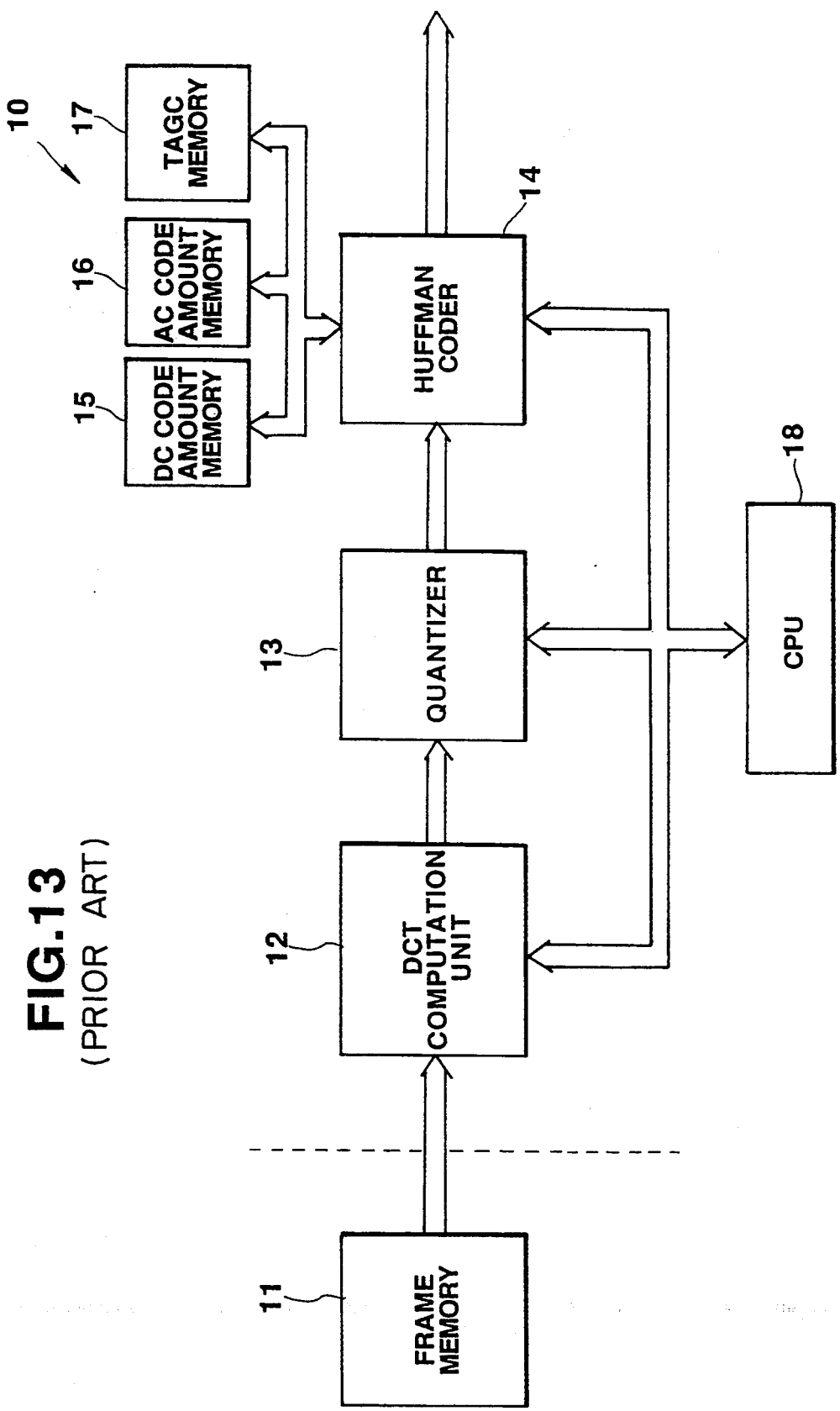
FIG. 13 is a block diagram of a conventional image data compressing apparatus.
Figure 14:
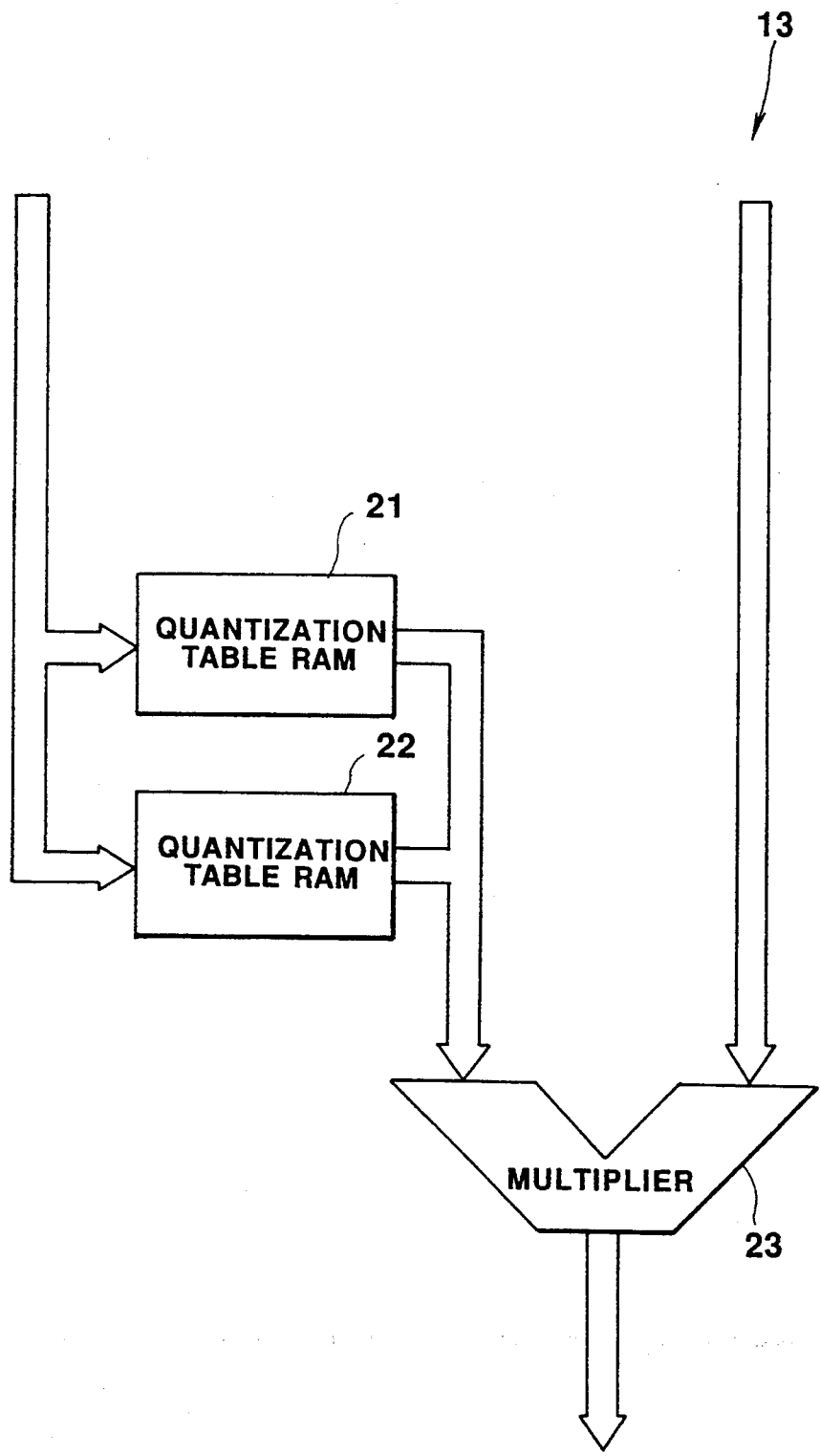
FIG. 14 is a block diagram of a quantizer in the conventional image data compressing apparatus.

FIGS. 10 through 12 illustrate an image data compressing apparatus and image data compressing method according to the second embodiment of the present invention. In this embodiment, a single frame is divided into a plurality of fields (lines) which are in turn used as plural types of quantization tables. In the following description of this embodiment, the same reference numerals and symbols as used for the first embodiment will be given to denote corresponding elements to avoid their redundant description.

First, the structure will be described. FIG. 10 is a block diagram of an image data compressing apparatus 60. As illustrated, the image data compressing apparatus 60 comprises a frame memory 31 for storing original image data, a DCT computation unit 61 for performing DCT computation in which image data from the frame memory 31 is subjected to DCT in accordance with two read modes (frame mode and field mode), which will be described later, a quantizer 62 for quantizing the DCT output data by selectively switching the two types of quantization tables field by field, a Huffman coder 63 for performing Huffman coding on the output of the quantizer 62 in two modes 1 and 2, as in the first embodiment, using individual memories (35 to 37, 64, 65) to be described later, a DC code amount memory 35 for storing the amount of DC codes generated by DC components, an AC code amount memory 36 for storing the amount of AC codes generated by AC components, a DC total-amount-of-generated-code (TAGC) memory 37 for storing the sum of the amounts of codes generated by the DC components of the entire blocks, a field TAGC memory 64 for storing the sum of the amounts of codes generated by AC components of an odd field, a field TAGC memory 65 for storing the sum of the amounts of codes generated by AC components of an even field, and a CPU 66, which performs the general control of the above units, prepares quantization tables considered as optimal and computes a predicted value for the amount of generated codes of each block from time to time.

The DCT computation unit 61 performs DCT on the image data read from the frame memory 31, and outputs the result to the quantizer 62. The DCT computation unit 61 has the following two modes to read data from the frame memory 31.

Frame mode: Read data as a single frame from the top line in order.

Field mode: Read odd-numbered lines first and then read even-numbered lines.

The Huffman coder 63 performs Huffman coding on output data of the quantizer 62 using the DC code amount memory 35 and AC code amount memory 36. The Huffman coder 63 stores the sum of the amount of codes generated by the DC components of the whole blocks in the DC TAGC memory 37, and stores the sums of the amounts of codes generated by the AC components for the two types of quantization tables (to be described later), which are selectively switched every predetermined number of fields, in the respective field AC TAGC memories 64 and 65.

The sum of the amount of codes generated by the AC components of the odd field is stored in the field TAGC memory 64, and the sum of the amount of codes generated by the AC components of the even field is stored in the field TAGC memory 65. In frame mode, a value is stored only in the field TAGC memory 64, and the value in the field TAGC memory 65 is insignificant.

FIG. 11 presents a block diagram of the quantizer 62. Referring to FIG. 11, the quantizer 62 comprises a quantization table RAM 71 for storing the Y quantization table of an odd field, a quantization table RAM 73 for storing the Y quantization table of an even field, a quantization table RAM 72 for storing the C quantization table of an odd field, a quantization table RAM 74 for storing the C quantization table of an even field, and a multiplier 75 for multiplying the result of the DCT computation by values of the individual quantization tables (i.e., multiplying the former value by a reciprocal of the latter value to accomplish the division) to accomplish quantization while changing the weighting.

The quantization table RAMs 71 to 74 are selectively used for items and fields as follows.

Frame mode: The quantization table in the quantization table RAM 71 is used for Y, and the quantization table in the quantization table RAM 72 is used for C.

Field mode: The quantization table in the quantization table RAM 71 is used for Y of an odd field, the quantization table in the quantization table RAM 73 is used for Y of an even field, the quantization table in the quantization table RAM 72 is used for C of an odd field, and the quantization table in the quantization table RAM 74 is used for C of an even field.

The Y quantization table 1 and C quantization table 1 used as the table 1 and the Y quantization table 2 and C quantization table 2 used as the table 2 have values of the quantization tables 51–54 as shown in, for example, FIG. 5.

The operation of this embodiment will now be described.

General Operation

It is assumed that data of an original image is held in the frame memory 31. The DCT computation unit 61 performs DCT computation on image data read from the frame memory 31, and sends the DCT output to the quantizer 62. The quantizer 62 performs quantization on the output data of the DCT computation unit 61 in accordance with values of the quantization table RAMs 71–74, and outputs the computation result to the Huffman coder 63. The Huffman coder 63 performs Huffman coding on the quantized data using the DC code amount memory 35 and the AC code amount memory 36, stores the sum of the amounts of codes generated by the DC components of the whole blocks in the DC TAGC memory 37, and writes the sums of the amounts of codes generated by the AC components of two divided fields of a single frame for the individual quantization tables, in the respective field TAGC memories 64 and 65. In this case, the sum of the amounts of codes generated by the AC components of an odd field, one of the two divided fields, is written in the field TAGC memory 64, while the sum of the amounts of codes generated by the AC components of an even field is written in the field TAGC memory 65.

The CPU 66 operates the above individual units as follows to prepare the quantization tables considered as optimal and computes the predicted value of the amount of generated codes of each block.

i) First, prepare proper quantization tables to match with the target sum of the amounts of generated codes, and write its reciprocal in the associated quantization table 71, 72, 73 and 74.

ii) Then, perform DCT (field mode)→quantization (field mode)→Huffman coding (mode 1).

iii) Prepare proper quantization tables and predict the amounts of generated codes for the individual blocks at that time in accordance with an algorithm to be described later. Then, write the values in the associated quantization table RAM 71 or 72, and the DC code amount memory 35 and AC code amount memory 36.

iv) Then, perform DCT (frame mode)→quantization (frame mode)→Huffman coding (mode 2).

Algorithm for Predicting the Amount of Generated Codes

An algorithm for preparing the quantization tables will be discussed first.

(1) The ways to plural types of quantization tables which allow the amount of generated codes to be linear is determined and are numbered in advance. For instance, there are 256 numbers ranging from 0 to 255, and the amount of generated codes increases linearly from 0 to 255.

(2) The proper two scalings are selected for the target amount of generated codes (CDN) and are written in the quantization tables that are used in the first field mode, and compression is performed accordingly. Let the selected scalings be Sb and Sh.

(3) Given that the total amount of generated DC codes in the DC TAGC memory 37 is DCall, and the field-by-field total amounts of generated AC codes in the field TAGC memories 64 and 65 corresponding to the scalings Sb and Sh are ACsb and ACsh, the desired scalings can be obtained from, for example, the equation 1.

An algorithm for predicting the amount of generated codes for each block will now be described.

(1) The ratio of the target amount of generated codes minus the amount of DC codes generated in the first attempt to the sum of the AC components generated by each table (ACsb, ACsh) is acquired.

(2) An original image shown in (a) in FIG. 12 is divided into two fields (odd field and even field) as shown in (b) in FIG. 12, the EOB length corresponding to each item is subtracted from the amounts of generated codes of the same blocks of the odd and even fields, the resultant values are multiplied by the ratio acquired in (1) above, and the resultant two values are added together.

(3) The resultant value of the addition in (2) above is divided into two, which are allocated as AC components of two (upper and lower) blocks as shown in (c) in FIG. 12.

(4) The average DC length and EOB length, which have been subtracted previously, are added to the value obtained in (3) above to yield the predicted value for the amount of generated codes of the associated block (see (d) in FIG. 12).

As described above, the image data compressing apparatus 60 of the second embodiment comprises the field TAGC memory 64 for storing the sum of the amounts of AC codes generated by AC components and another field TAGC memory 65 for storing the sum of the amounts of AC codes generated by AC components, divides a frame into odd and even fields and predicts the amounts of generated codes of the whole blocks and each block based on the amounts of codes generated by using separate quantization tables in the first compression, and compresses the frame data to the target amount of generated codes in the second compression. The second embodiment, like the first embodiment, can execute the accurate code amount control in two compressions, thus significantly improving the processing speed. In particular, the image data compressing apparatus 60 of this embodiment can suitably be adapted for use in an electronic camera which has a field mode.

Although the foregoing description of the two embodiments has been given with reference to the case where the present invention is applied to an image data compressing apparatus which is based on the JPEG algorithm, this invention can of course be applied to any apparatus which controls the amount of generated codes. Further, this invention can also applied to any apparatus which uses quantization tables, and the schemes to prepare the quantization tables are not limited to those of the embodiments already described.

Although the two embodiments employ a Huffman coding scheme, the coding is not limited to this particular type. For instance, instead of the block coding like the Huffman coding, entropy coding may be used with arithmetic codes, such as Q-Coder.

Although DCT is used as a transform/coding scheme in the two embodiments, this scheme is not limited to the DCT system. For instance, the present invention can be applied to image data compressing apparatuses which employ Hadamard transform, Harr transform, slant transform and symmetrical sine transform.

In addition, the number and types of the circuits and components which constitute the image data compressing apparatus 30 or 60, the quantizer 33 or 62, and other essential devices are not limited to those of the above-described embodiments.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image data compressing apparatus comprising:
discrete cosine transform means for performing discrete cosine transform on image data to output transformed image data, the image data being defined as a plurality of blocks;
quantization table storage means for storing plural types of quantization tables used in quantization, the tables having different quantization step sizes;
quantizing means for quantizing the blocks of the transformed image data from said discrete cosine transform means by using a plurality of said quantization tables in such a manner that the respective blocks of the transformed image data are quantized by using different quantization tables of said plurality of quantization tables to output quantized data;
coding means for coding the quantized data quantized by said quantizing means so as to generate codes including DC components and AC components in each of the blocks;
bit length of code storage means for storing bit lengths of the codes of DC components and AC components generated in each of the blocks at a coding time;
total-bit length-of-generated-code computing means for computing a total bit length of generated codes of said DC components and a total bit length of generated codes of said AC components for each quantization table used in said quantizing means;
total-bit length-of generated-code storage means for storing said total bit length of generated codes computed by said total bit length-of-generated-code computing means; and
means for predicting bit lengths of generated codes in each of the blocks to form new quantization tables in accordance with the bit length of codes stored in said total-bit-length-of-code storage means;
wherein said quantizing means and coding means perform a first compression in which said plural types of quantization tables are used to predict a change in the bit length of generated codes instead of changing one quantization table of said plural types of quantization tables to another quantization table, and the new quantization tables suitable for a target bit length of generated codes are prepared to perform a second compression to a target bit length of codes.

2. The image data compressing apparatus according to claim 1, wherein said coding means includes a Huffman coding unit for providing compact coding on information to which a probability distribution is given.

3. An image data compressing apparatus comprising:
discrete cosine transform means for performing discrete cosine transform on image data to output transformed image data, the image data being defined as a plurality of blocks which are divided into two groups and arranged in a checkered pattern;
quantization table storage means for storing plural types of quantization tables used in quantization, the tables having different quantization step sizes;
quantizing means for quantizing the blocks of the transformed image data from said discrete cosine transform means by selectively using two of said quantization tables to predict a change in bit length of generated codes caused by changing said quantization tables in such a manner that the respective blocks of the transformed image data are quantized by using different quantization tables of said plurality of quantization tables to output quantized data;
coding means for coding the quantized data quantized by said quantizing means so as to generate codes including DC components and AC components in each of the blocks;
bit length of code storage means for storing bit lengths of the codes of DC components and AC components generated in each of the blocks at a coding time;
total-bit-length-of-generated-code computing means for computing a total bit length of generated codes of said DC components and a total bit length of generated codes of said AC components for each of the two quantization tables switched in a checkerwise manner;
total-bit length-of-generated-code storage means for storing said total bit length of generated codes computed by said total bit length-of-generated-code computing means; and
means for predicting bit lengths of generated codes in each of the blocks to form new quantization tables in accordance with the bit length of codes stored in said total-bit-length-of-code storage means;
wherein said quantizing means and coding means perform a first compression in which said two quantization tables are switched checkerwise to prepare quantization tables and predict a change in bit length of generated codes instead of changing one quantization table of said plural types of quantization tables to another quantization table, and the new quantization tables suitable for a target bit length of generated codes are prepared to perform a second compression to a target bit length of codes.

4. The image data compressing apparatus according to claim 3, wherein said coding means includes a Huffman coding unit for providing compact coding on information to which a probability distribution is given.

5. An image data compressing apparatus comprising:
discrete cosine transform means for performing discrete cosine transform on image data to output transformed image data, the image data being defined as a plurality of blocks which are divided into two groups and arranged in a checkerwise pattern;
quantization table storage means for storing plural types of quantization tables used in quantization, the tables having different quantization step sizes;
quantizing means for quantizing the blocks of the transformed image data from said discrete cosine transform means by selectively using two of said quantization tables field by field of the image data to predict a change in bit length of generated codes caused by changing said quantization tables in such a manner that the respective blocks of the transformed image data are quantized by using different quantization tables of said plurality of quantization tables to output quantized data;

coding means for coding the quantized data quantized by said quantizing means so as to generate codes including DC components and AC components in each of the blocks;

bit length of code storage means for storing bit lengths of the codes of DC components and AC components generated in each of the blocks at a coding time;

total-bit-length-of-generated-code computing means for computing a total bit length of generated codes of said DC components and a total bit length of generated codes of said AC components for each of the two quantization tables switched field by field;

total-bit length-of-generated-code storage means for storing said total bit length of generated codes computed by said total-bit-length-of-generated-code computing means; and means for predicting bit lengths of generated codes in each of the blocks to form new quantization tables in accordance with the bit length of codes stored in said total-bit-length-of-code storage means;

wherein said quantizing means and coding means perform a first compression for a single frame of the image data in which the single frame of the image data is divided into two fields, two different quantization tables are used to perform quantization for the respective fields so as to predict a change in the bit length of generated codes of each block, and the new quantization tables suitable for a target bit length of generated codes of each block of the frame data are prepared to perform a second compression to the target bit length of codes.

6. The image data compressing apparatus according to claim 5, wherein said frame is divided into an odd field and an even field.

7. The image data compressing apparatus according to claim 5, wherein said coding means includes a Huffman coding unit for providing compact coding on information to which a probability distribution is given.

8. An image data compressing apparatus comprising:

transform means for transforming image data to output transformed image data, the image data being divided into a plurality of blocks;

quantization table storage means for storing quantization tables used in quantization, the tables having different quantization step sizes;

quantizing means for quantizing the blocks of the transformed image data from said transform means based on said quantization tables to predict a change in a bit length of generated codes caused by changing said quantization tables;

coding means for coding components quantized by said quantizing means in accordance with the predicted bit length of generated codes with respect to each of blocks of the image data;

bit length of code storage means for storing bit lengths of codes of DC components and AC components generated in each of the blocks at a coding time;

total-bit length-of-generated-code computing means for computing a total bit length of generated codes of said DC components and a total bit length of generated codes of said AC components;

total-bit length-of-generated-code storage means for storing said total bit length of generated codes computed by said total-bit length-of generated-code computing means; and at least one of distributing means including:
individual-block distributing means for acquiring a difference between a sum of predicted values computed by said total-bit length-of-generated-code computing means and a target bit length of generated codes as a remainder, and dividing said remainder by a total number of said blocks to distribute said remainder to said blocks, Y-block distributing means for distributing said remainder to those blocks of luminance information (Y), Y-, R-Y- and B-Y-block distributing means for distributing said remainder to left blocks of luminance information (Y) and color information (R-Y, B-Y) in a predetermined ratio, Y-left block distributing means for distributing said remainder to left blocks of luminance information (Y), and Y-upper-left block distributing means for distributing said remainder to upper left blocks of luminance information (Y).

9. The image data compressing apparatus according to claim 8, wherein said transform means includes a discrete cosine transform unit for performing discrete cosine transform on image data.

10. The image data compressing apparatus according to claim 8, wherein said coding means includes a Huffman coding unit for providing compact coding on an information to which a probability distribution is given.

11. An image data compressing method for use in an image data compressing apparatus comprising:

transform means for transforming image data to output transformed image data, the image data being divided into a plurality of blocks;

quantization table storage means for storing quantization tables used in quantization;

quantizing means for quantizing the blocks of the transformed image data from said transform means based on said quantization tables;

coding means for coding components quantized by said quantizing means in accordance with a predicted bit length of generated codes of each block;

bit length of code storage means for storing bit lengths of codes of DC components and AC components generated in individual blocks at a coding time;

total-bit length-of-generated-code computing means for computing total bit lengths of generated codes of said DC components and AC components;

total-bit length-of-generated-code storage means for storing said total bit length of generated codes computed by said total bit length-of-generated-code computing means;

said method comprising steps of:
acquiring a difference between a sum of predicted values computed by said total-bit length-of-generated-code computing means and a target amount of generated codes as a remainder first, dividing said remainder by a total number of said blocks to distribute said remainder to said blocks, distributing said remainder to those blocks of luminance information (Y), then distributing said remainder to left blocks of luminance information (Y) and color information (R-Y, B-Y) in a predetermined ratio, then distributing said remainder to left blocks of luminance information (Y), and distributing said remainder to upper left blocks of luminance information (Y).

12. The image data compressing method according to claim 11, wherein said transform means includes a discrete cosine transform unit for performing discrete cosine transform on image data.

13. The image data compressing method according to claim 11, wherein said coding means performs Huffman coding as compact coding on an information source to which a probability distribution is given.

* * * * *